US012802405B2

(12) United States Patent
Yu

(10) Patent No.: US 12,802,405 B2
(45) Date of Patent: Nov. 17, 2026

(54) FEATURE MAP GENERATION METHOD AND APPARATUS, STORAGE MEDIUM, AND COMPUTER DEVICE

(71) Applicant: Tencent Technology (Shenzhen) Company Limited, Shenzhen (CN)

(72) Inventor: Changsong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 267 days.

(21) Appl. No.: 18/633,850

(22) Filed: Apr. 12, 2024

(65) Prior Publication Data

US 2024/0257501 A1 Aug. 1, 2024

Related U.S. Application Data

(63) Continuation of application No. PCT/CN2023/097112, filed on May 30, 2023.

(30) Foreign Application Priority Data

Aug. 8, 2022 (CN) ......................... 202210945938.5

(51) Int. Cl.

*G06V 10/77* (2022.01)
*G06T 7/73* (2017.01)

(Continued)

(52) U.S. Cl.

CPC ............ *G06V 10/7715* (2022.01); *G06T 7/73* (2017.01); *G06V 10/36* (2022.01); *G06V 10/44* (2022.01);

(Continued)

(58) Field of Classification Search

CPC .... G06V 10/7715; G06V 10/36; G06V 10/44; G06V 10/46; G06V 10/761; G06V 10/98;

(Continued)

(56) References Cited

U.S. PATENT DOCUMENTS

2019/0156145 A1* 5/2019 Pourian .................. G06F 18/22
2020/0005487 A1 1/2020 Jiang et al.

(Continued)

FOREIGN PATENT DOCUMENTS

CN 110648397 A 1/2020
CN 111780764 A 10/2020
CN 113465617 A 10/2021
CN 114565777 A 5/2022
CN 114674328 A 6/2022

(Continued)

OTHER PUBLICATIONS

European Search Report dated Sep. 23, 2025 in Application No. 23851329.5.

(Continued)

*Primary Examiner* — Matthew C Bella
*Assistant Examiner* — Andrew B. Jones
(74) *Attorney, Agent, or Firm* — Sughrue Mion, PLLC

(57) ABSTRACT

A feature map generation method/apparatus including obtaining a plurality of image frames photographed for a target scene, separately extracting image feature points from each image frame, determining corresponding feature descriptors, forming image feature points with a matching relationship in the image feature points of the each image frame into a feature point set, determining a representative feature point from the feature point set, calculating a difference between a feature descriptor corresponding to a remaining image feature point and a feature descriptor corresponding to the representative feature point, determining a position error of the feature point set, iteratively updating the remaining image feature point in the feature point set, and obtaining an updated feature point set, and determining a space feature point corresponding to the updated feature point set, and generating a feature map based on the space feature point.

20 Claims, 8 Drawing Sheets

(51) Int. Cl.

| | |
|---|---|
| ***G06V 10/36*** | (2022.01) |
| ***G06V 10/44*** | (2022.01) |
| ***G06V 10/46*** | (2022.01) |
| ***G06V 10/74*** | (2022.01) |
| ***G06V 10/98*** | (2022.01) |

(52) U.S. Cl.
CPC ............ *G06V 10/46* (2022.01); *G06V 10/761* (2022.01); *G06V 10/98* (2022.01)

(58) Field of Classification Search
CPC .. G06V 20/586; G06V 10/462; G06V 10/757; G06V 20/56; G06V 10/771; G06V 10/751; G06T 7/73; G06T 2200/08; G06T 2207/10024; G06T 2207/30252; G06T 7/246; G06T 7/579; G06F 18/00; G06F 9/48
See application file for complete search history.

(56) References Cited

U.S. PATENT DOCUMENTS

2020/0342626 A1* 10/2020 Chen ......................... G06T 7/74
2022/0164595 A1* 5/2022 Zhou .................... G06V 10/757
2023/0039143 A1* 2/2023 Komuro .................... G06T 7/73

FOREIGN PATENT DOCUMENTS

WO 2020/108285 A1 6/2020
WO 2022079292 A1 4/2022

OTHER PUBLICATIONS

International Search Report for PCT/CN2023/097112 dated Sep. 14, 2023.

* cited by examiner

FEATURE MAP GENERATION METHOD AND APPARATUS, STORAGE MEDIUM, AND COMPUTER DEVICE

CROSS-REFERENCE TO RELATED APPLICATIONS

This application is a continuation application of International Application No. PCT/CN2023/097112 filed on May 30, 2023, which claims priority to Chinese Patent Application No. 202210945938.5, filed with the China National Intellectual Property Administration on Aug. 8, 2022, the disclosures of each being incorporated by reference herein in their entireties.

FIELD

The disclosure relates to the field of computer technologies, and in particular, to a feature map generation method and apparatus, a computer device, a storage medium, and a computer program product.

BACKGROUND

With development of computer technologies, visual positioning technologies emerge. In the visual positioning technologies, a feature map may be constructed. The feature map is a data structure and may use a relevant geometric feature (such as a point, a straight line, or a surface) to represent an observation environment, thereby assisting a to-be-positioned moving device in positioning. For example, in automatic driving, an automatic driving vehicle may be positioned by constructing the feature map.

As the use of automatic driving becomes widespread, a requirement for positioning accuracy is increasingly high. However, a feature map constructed in the related art often suffers from low positioning accuracy during use.

SUMMARY

According to some embodiments, a feature map generation method and apparatus, a computer device, a computer-readable storage medium, and a computer program product are provided.

Some embodiments provide a feature map generation method, performed by a computer, and including: obtaining a plurality of image frames photographed for a target scene, separately extracting image feature points from each image frame of the plurality of image frames, and determining corresponding feature descriptors based on a position in a corresponding image at which the extracted image feature points are located; forming image feature points with a matching relationship in the image feature points of the each image frame into a feature point set; determining a representative feature point from the feature point set, and calculating a difference between a feature descriptor corresponding to a remaining image feature point in the feature point set and a feature descriptor corresponding to the representative feature point; determining a position error of the feature point set based on the difference, iteratively updating the remaining image feature point in the feature point set based on the position error, and obtaining an updated feature point set based on an iteration stop condition being satisfied; and determining a space feature point corresponding to the updated feature point set based on a position in the corresponding image at which each image feature point in the updated feature point set is located, and generating a feature map based on the space feature point, the feature map positioning a to-be-positioned moving device in the target scene.

Some embodiments provide a feature map generation apparatus. The apparatus includes: at least one memory configured to store program code; and at least one processor configured to read the program code and operate as instructed by the program code, the program code comprising: feature extraction code configured to cause at least one of the at least one processor to obtain a plurality of image frames photographed for a target scene, separately extracting image feature points from each image frame, and determine corresponding feature descriptors based on a position in a corresponding image at which the extracted image feature points are located; feature point set determining code configured to cause at least one of the at least one processor to form image feature points with a matching relationship in the image feature points of each image frame into a feature point set; difference calculation code configured to cause at least one of the at least one processor to determine a representative feature point from the feature point set, and calculate a difference between a feature descriptor corresponding to a remaining image feature point in the feature point set and a feature descriptor corresponding to the representative feature point; position update code configured to cause at least one of the at least one processor to determine a position error of the feature point set based on the difference, iteratively update the remaining image feature point in the feature point set based on the position error, and obtain an updated feature point set based on an iteration stop condition being satisfied; and feature map generation code configured to cause at least one of the at least one processor to determine a space feature point corresponding to the updated feature point set based on a position in the corresponding image at which each image feature point in the updated feature point set is located, and generate a feature map based on the space feature point, the feature map positioning a to-be-positioned moving device in the target scene.

Some embodiments provide a computer-readable storage medium storing computer code which, when executed by at least one processor, causes the at least one processor to at least: obtain a plurality of image frames photographed for a target scene, separately extract image feature points from each image frame of the plurality of image frames, and determine corresponding feature descriptors based on a position in a corresponding image at which the extracted image feature points are located; form image feature points with a matching relationship in the image feature points of the each image frame into a feature point set; determine a representative feature point from the feature point set, and calculate a difference between a feature descriptor corresponding to a remaining image feature point in the feature point set and a feature descriptor corresponding to the representative feature point; determine a position error of the feature point set based on the difference, iteratively update the remaining image feature point in the feature point set based on the position error, and obtain an updated feature point set based on an iteration stop condition being satisfied; and determine a space feature point corresponding to the updated feature point set based on a position in the corresponding image at which each image feature point in the updated feature point set is located, and generate a feature map based on the space feature point, the feature map positioning a to-be-positioned moving device in the target scene.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

A feature map generation method provided in some embodiments may be applied to an intelligent traffic system (ITS) and an intelligent vehicle infrastructure cooperative system (IVICS).

Figure 1:
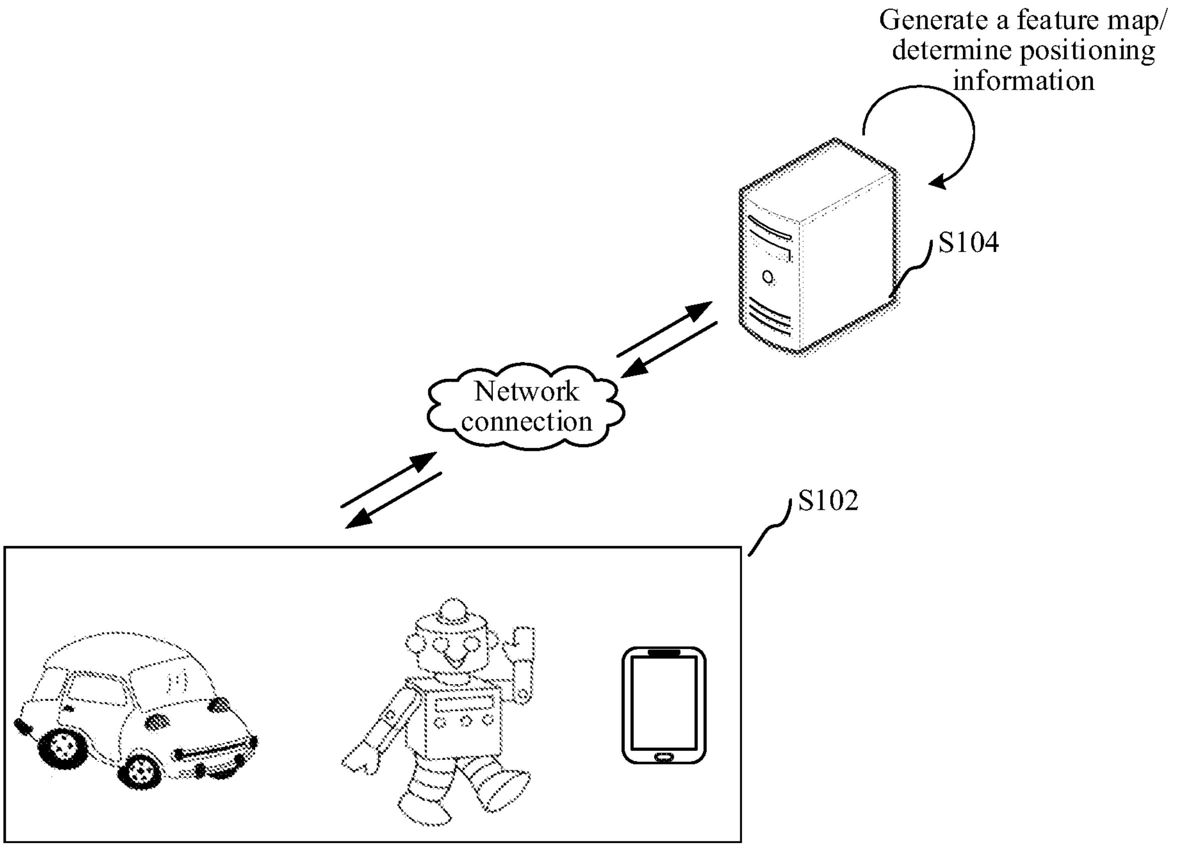
FIG. 1 is a schematic diagram of an application environment of a feature map generation method according to some embodiments.

The feature map generation method provided in some embodiments may be applied to an application environment shown in FIG. 1. A device 102 communicates with a server 104 via a network. The device 102, also referred to as a moving device, refers to one of a device that may move autonomously or a device that may move passively. The device that moves autonomously may be various vehicles, robots, and the like. The device that moves passively may be, for example, a terminal carried by a user and moving with the user, a smartphone, a tablet computer, or a portable wearable device. A photographing device is mounted on the moving device 102. The server 104 may be an independent physical server, a server cluster or a distributed system including a plurality of physical servers, or a cloud server that provides a cloud computing service. In some embodiments, in a feature map generation phase, a photographing device on any moving device may photograph a target scene to obtain a plurality of image frames and send the photographed plurality of image frames to the server. The server generates a feature map based on each image frame and stores the feature map. In a positioning information determining phase, a to-be-positioned moving device may send inertial measurement data, speed measurement data, and a target image photographed in the target scene to the server. The server may determine positioning information of the to-be-positioned moving device based on the data and the stored feature map, and send the positioning information to the to-be-positioned moving device.

It may be understood that in some embodiments, in a case that any moving device moves in a target scene, a photographing device on the moving device may photograph the target scene to obtain a plurality of image frames, and then generate a feature map based on each image frame and store the feature map, so that positioning information may be determined based on the stored feature map in a case that the moving device moves in the target scene again. In addition, the feature map generated by the moving device may be further sent to the server. In a case that another to-be-positioned moving device moves in the target scene, the feature map may be downloaded, and positioning information may be determined based on the downloaded feature map. In some embodiments, in a case that another to-be-positioned moving device moves in the target scene, inertial measurement data, speed measurement data, and a target image photographed in the target scene may be sent to the server. The server may determine positioning information of the to-be-positioned moving device based on the data and the stored feature map, and return the positioning information to the to-be-positioned moving device.

Figure 2:
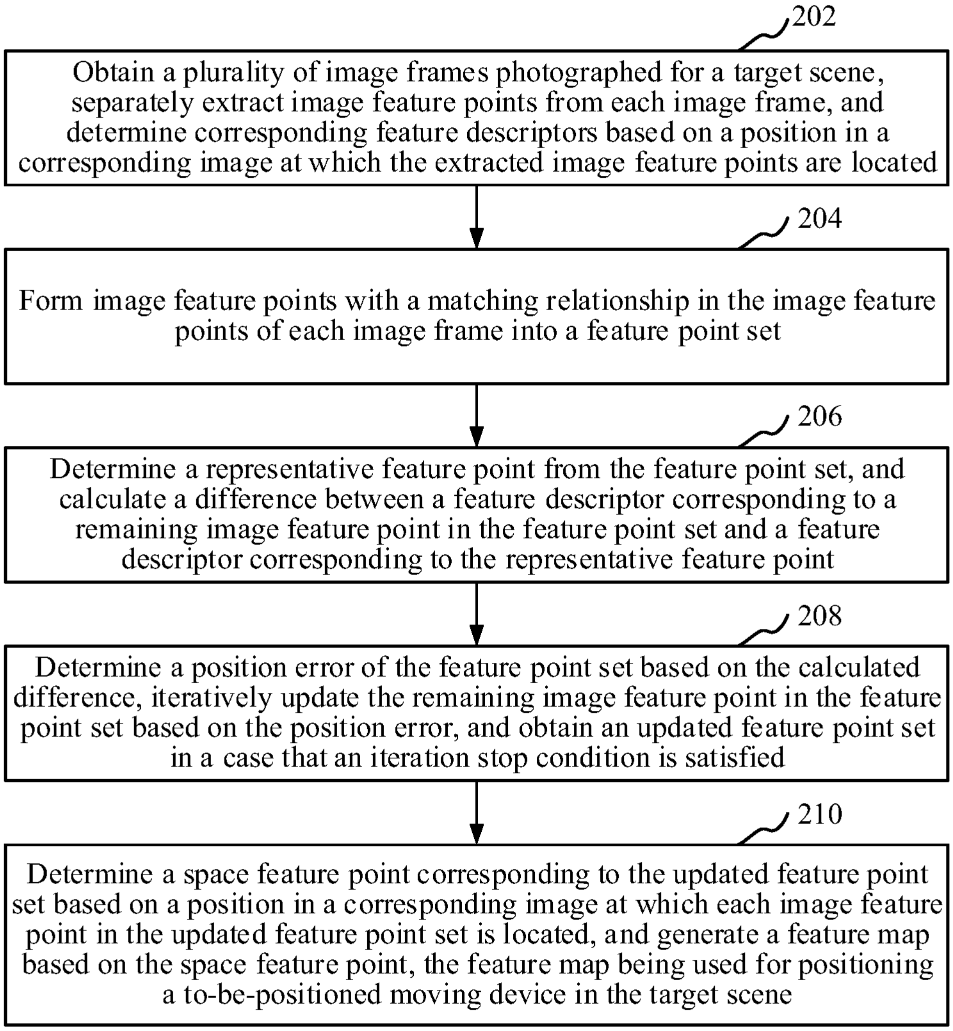
FIG. 2 is a schematic flowchart of a feature map generation method according to some embodiments.

In some embodiments, as shown in FIG. 2, a feature map generation method is provided. The method is performed by a computer device. In some embodiments, the method may be individually performed by a computer device such as the moving device or the server in FIG. 1, or may be collaboratively performed by the moving device and the server. In some embodiments, an example in which the method is applied to the server in FIG. 1 is used for description, and the method includes the following operations.

Operation 202: Obtain a plurality of image frames photographed for a target scene, separately extract image feature points from each image frame, and determine corresponding feature descriptors based on a position in a corresponding image at which the extracted image feature points are located.

The target scene refers to a specific scene for which the feature map to be generated is targeted. The target scene may be specifically an environment in which a vehicle is located. For example, the target scene may be a scene determined by a possible driving route of the vehicle. In a case that the vehicle is driving in the scene, a plurality of image frames of surroundings are obtained through camera acquisition. The image feature points are specific pixel points on an image that may be used for describing a feature of a scene, such as significant edge points, histogram of oriented gradient features, and Haar features. The feature descriptor has a one-to-one correspondence with the image feature point. The feature descriptor is a representation of a Gaussian image gradient statistical result in a neighborhood near the feature point. The feature descriptor may be used for describing a corresponding image feature point.

In some embodiments, the moving device may acquire the plurality of image frames and transmit the plurality of image frames to the server in real time for processing. In some embodiments, the moving device may only be responsible for storing the acquired plurality of image frames. After image acquisition is completed, the stored plurality of image frames are inputted to the server in a specific manner for processing. After obtaining the plurality of image frames photographed for the target scene, the server may extract the image feature points from each image frame. For each image feature point, the moving device may determine a feature descriptor corresponding to the image feature point based on the position in the image at which the image feature point is located, so that image feature points of each image frame and a feature descriptor of each image feature point may be obtained.

In some embodiments, the image feature points may be extracted by using, but are not limited to, an algorithm such as Good Features to Track. A corresponding function is provided in a computer vision library OpenCV. In some embodiments, feature point extraction may be performed on the image by training a machine learning model. The machine learning model includes a plurality of convolutional layers. Each convolutional layer outputs a feature image after performing different processing on an original image. The feature image represents a possibility that each position in the original image is a feature point, and an original feature point may be determined based on the feature image. It may be understood that a plurality of image feature points may be extracted from each image frame. The plurality of image feature points refer to at least two image feature points.

Operation 204: Form image feature points with a matching relationship in the image feature points of each image frame into a feature point set.

The image feature points with a matching relationship refer to similar image feature points. In some embodiments, the image feature points with a matching relationship may be determined based on feature descriptors of the image feature points. In a case that feature descriptors of two image feature points reach a specific degree of similarity, it is considered that the two image feature points are matched.

Figure 3:
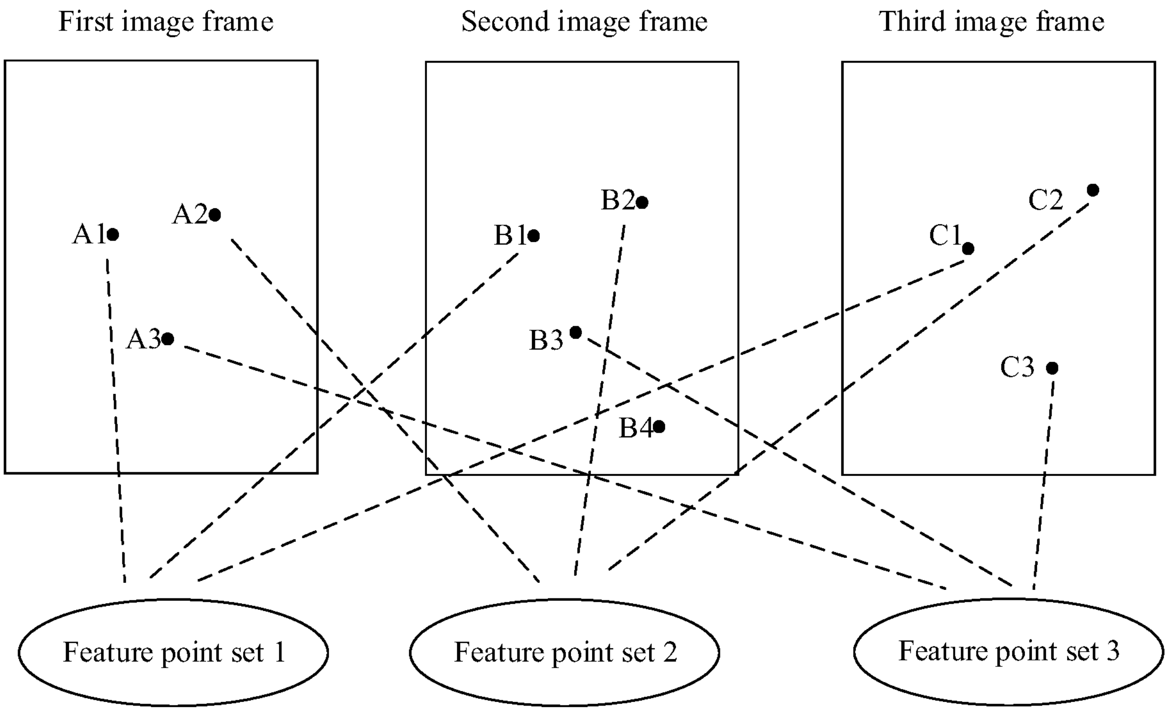
FIG. 3 is a schematic composition diagram of a feature point set according to some embodiments.

In some embodiments, the server may divide all image feature points in each image frame into a set based on a matching relationship between the image feature points, to obtain a plurality of feature point sets. In these feature point sets, the image feature points belonging to the same feature point set have a matching relationship with each other. For example, as shown in FIG. 3, it is assumed that there are three image frames in total. The first image frame includes image feature points A1, A2, and A3. The second image frame includes image feature points B1, B2, B3, and B4. The third image frame includes image feature points C1, C2, and C3. Assuming that A1, B1, and C1 are image feature points with a matching relationship with each other, A2, B2, and C2 are image feature points with a matching relationship with each other, and A3, B3, and C3 are image feature points with a matching relationship with each other, A1, B1, and C1 may form a feature point set 1, A2, B2, and C2 may form a feature point set 2, and A3, B3, and C3 may form a feature point set.

In some embodiments, it is assumed that there are i frames in the plurality of image frames, and i being an integer from 1 to M. N image feature points are first extracted from an $i^{th}$ image frame. For the method of extracting image feature points, refer to the foregoing descriptions. In a case that i=1, for the first image frame, a corresponding feature point set may be created for each image feature point in the first image frame. In a case that i>1, and j being an integer from 1 to N, it is determined whether there is an image feature point in an $(i-1)^{th}$ image frame that matches a $j^{th}$ image feature point in the $i^{th}$ image frame. If there is an image feature point matching the $j^{th}$ image feature point, the $j^{th}$ image feature point is added to a feature point set corresponding to the image feature point matching the $j^{th}$ image feature point (because the $(i-1)^{th}$ frame is processed, the feature point set is to exist). In a case that there is no image feature point matching the $j^{th}$ image feature point, a feature point set corresponding to the $j^{th}$ image feature point is created. Once no new image feature point is added to a feature point set, it may be considered that the feature point set is created. The images are processed frame by frame by using the foregoing method. After processing of the $M^{th}$ image frame is completed, a plurality of feature point sets are obtained. Each feature point set includes at least one image feature point, or a sequence of image feature points with a matching relationship with each other. It may be understood that in some embodiments, in a case that the feature map is constructed in real time, M may not be known, but specific operations are similar to the above, and i only needs to be incremented until all images are processed.

Operation 206: Determine a representative feature point from the feature point set, and calculate a difference between a feature descriptor corresponding to a remaining image feature point in the feature point set and a feature descriptor corresponding to the representative feature point.

The representative feature point set refers to an image feature point in the feature point set that may represent the feature point set. The remaining image feature point in the feature point set refers to an image feature point other than the representative feature point in the feature point set. For example, it is assumed that a feature point set includes four image feature points A1, B1, C1, and D1. A1 is a representative feature point, and B1, C1, and D1 are remaining image feature points. In some embodiments, the server may randomly select an image feature point from each feature point set as a respective representative feature point of each feature point set. In some embodiments, the server may calculate an average feature point of each feature point set, and determine an image feature point closest to the respective average feature point in each feature point set as the representative feature point.

In some embodiments, to avoid overall offset during iteratively updating the image feature point in the feature point set, in some embodiments, a representative feature point may be determined in each feature point set. In an iterative update process, a position of the representative feature point is kept fixed, a difference between the feature descriptor corresponding to the remaining image feature point in each feature point set and a feature descriptor corresponding to the representative feature point of each feature point set is calculated to obtain a difference corresponding to each remaining image feature point.

In some embodiments, for each feature point set, the server may calculate an absolute difference between the feature descriptor corresponding to each remaining image feature point in the feature point set and a feature descriptor corresponding to the feature point set to obtain the difference corresponding to each remaining image feature point. In some embodiments, after calculating the absolute difference, the server may calculate a square of the absolute difference to obtain the difference corresponding to each remaining image feature point.

Operation 208: Determine a position error of the feature point set based on the calculated difference, iteratively update the remaining image feature point in the feature point set based on the position error, and obtain an updated feature point set in a case that an iteration stop condition is satisfied.

For example, the iteration stop condition may be one of the following: the position error reaches a minimum value, a quantity of iterations reaches a preset quantity, or iteration duration reaches minimum duration.

In some embodiments, because in a case that image feature points are determined, each feature point set determines a space feature point, to improve accuracy of the determined space feature point, an overall position error of the feature point set needs to be reduced. Based on this, in some embodiments, for each feature point set, the server may collect a difference corresponding to each remaining image feature point in the feature point set, and determine the position error of the feature point set based on the collected difference, to iteratively update a position of each image feature point other than the representative feature point in a direction of minimizing the position error. Each update is equivalent to optimizing the position of the image feature point. A position error is recalculated based on a feature descriptor corresponding to an optimized image feature point, and next update is performed. The operation is repeated to optimize the position of the image feature point a plurality of times. In a case that the iteration stop condition is satisfied, each updated image feature point and the representative feature point belonging to the same feature point set form an updated feature point set. In an update process, a gradient descent algorithm may be used for updating the position of the image feature point.

In some embodiments, to avoid degradation in an optimization process, the server may calculate a singular value of a Hessian matrix for the feature point set. If the maximum singular value divided by the minimum singular value is greater than a preset threshold, the update is not performed.

Operation 210: Determine a space feature point corresponding to the updated feature point set based on a position in a corresponding image at which each image feature point in the updated feature point set is located, and generate a feature map based on the space feature point, the feature map being used for positioning a to-be-positioned moving device in the target scene.

The space feature point refers to a three-dimensional feature point, that is, a corresponding point of the feature point on the image in three-dimensional space. The feature map in some embodiments may be a data structure including a plurality of space feature points, and a specific form of the data structure is not limited. The to-be-positioned moving device refers to a moving device that needs to be positioned. The to-be-positioned moving device and a moving device that sends the plurality of image frames may be the same moving device, or may be different moving devices. A pose of the image to which the image feature point belongs refers to a pose of a camera during photographing the image frame. This pose may be obtained through posture transformation based on a pose of the moving device at a same time instant and a relative pose relationship between the camera and the moving device.

In some embodiments, for each updated feature point set, the server may perform triangulation calculation based on the position in a corresponding image at which each image feature point in the updated feature point set is located and the pose of the image, to obtain a space feature point corresponding to each feature point set. Further, the server may generate the feature map based on each space feature point and store the feature map. Then, in a subsequent positioning process, the feature map may be used to assist the to-be-positioned moving device in positioning. The triangulation calculation is an existing method for mapping a two-dimensional image feature point to a three-dimensional space feature point. Details are not described herein. It may be understood that a descriptor of the space feature point may be an average value of descriptors of all the image feature points that generate the space feature point.

In some embodiments, the server may specifically determine the pose of the image to which the image feature point belongs by using the following operations. First, a relative pose between the moving device and the camera is obtained. The relative pose usually remains unchanged in a moving process of the moving device and may be obtained through calibration. Then, a pose of the moving device at each moment is determined based on inertial measurement data and speed measurement data uploaded by the moving device. Next, the pose of the moving device at each moment is aligned with an acquisition moment of the plurality of image frames. The alignment here refers to determining a pose of the moving device corresponding to each image frame. A data acquisition moment corresponding to the pose (a moment when the inertial measurement data and the speed measurement data are acquired) is the same as an acquisition moment of the image frame (or the same within an error allowed range). Finally, a pose of the image frame may be obtained by performing posture transformation based on a pose of the moving device corresponding to each image frame and the relative pose between the moving device and the camera.

In the foregoing feature map generation method, a plurality of image frames photographed for a target scene are obtained, image feature points from each image frame are separately extracted, and corresponding feature descriptors are determined based on a position in a corresponding image at which the extracted image feature points are located. Image feature points with a matching relationship in the image feature points of each image frame are formed into a feature point set. A representative feature point is determined from the feature point set, and a difference between a feature descriptor corresponding to a remaining image feature point in the feature point set and a feature descriptor corresponding to the representative feature point is calculated. A position error of the feature point set is determined based on the calculated difference, the remaining image feature point in the feature point set is iteratively updated based on the position error, and an updated feature point set is obtained in a case that an iteration stop condition is satisfied. A space feature point corresponding to the updated feature point set is determined based on a position in a corresponding image at which each image feature point in the updated feature point set is located, and a feature map is generated based on the space feature point. Because in a process of generating the feature map, the position of the image feature point is optimized based on the feature descriptor of the image feature point, so that the generated feature map may be robust, to greatly improve positioning accuracy by using the feature map during positioning.

In some embodiments, the determining a position error of the feature point set based on the calculated difference includes: separately using each remaining image feature point in the feature point set as a target feature point, and separately calculating matching confidence between each target feature point and the representative feature point; calculating a position error corresponding to each target feature point based on the matching confidence and difference corresponding to each target feature point; and collecting the position error corresponding to each target feature point to obtain the position error of the feature point set.

The matching confidence between the target feature point and the representative feature point is used for representing a matching degree between the target feature point and the representative feature point. A higher matching degree indicates two more similar feature points.

In some embodiments, for each feature point set, the server may separately use each remaining image feature point in the feature point set as the target feature point. For each target feature point, the server may calculate the matching confidence between the target feature point and the representative feature point, then multiply the matching confidence and the difference to obtain the position error corresponding to the target feature point, and finally collect the corresponding position error of each target feature point to obtain the position error of the feature point set. The statistics collection may be one of summing, calculating an average value, or calculating a median.

In a specific embodiment, the server may calculate the position error of the feature point set by using the following Formula (1). j represents a $j^{th}$ feature point set.

$$E^j_{FKA}$$

is a position error of the $j^{th}$ feature point set. u and V represent the image feature points. i(u) represents a $u^{th}$ image feature point of the $i^{th}$ image frame. k(v) represents a $v^{th}$ feature point of a kth image frame. $w_{uv}$ is matching confidence. $p_u$ represents a position of an image feature point u on the image. $p_v$ represents a position of an image feature point v on the image. $F_{i(u)}[p_u]$ represents a descriptor of $p_u$. $F_{k(v)}[p_v]$ represents a descriptor of $p_v$.

$$E^j_{FKA} = \sum_{(u,v)\in Q(j)} w_{uv}(F_{i(u)}[p_u] - F_{k(v)}[p_v])^2 \quad \text{Formula (1)}$$

In some embodiments, the matching confidence between the image feature points is calculated, and the position error of each image feature point is obtained based on the matching confidence and the difference. The position error of each image feature point may be accurate. Finally, the position error of the feature point set obtained by collecting the position error of each image feature point in the feature point set is accurate, so that a feature map with high accuracy can be obtained to further improve positioning accuracy.

In some embodiments, the separately calculating matching confidence between each target feature point and the representative feature point includes: separately obtaining a feature descriptor of each target feature point, and obtaining a feature descriptor of the representative feature point; and separately calculating a vector similarity between the feature descriptor of each target feature point and the feature descriptor of the representative feature point, and using each vector similarity as matching confidence between each target feature point and the representative feature point.

The vector similarity is used for describing a similarity degree between two vectors. The feature descriptor is in the form of a vector, so that the vector similarity may be calculated. In some embodiments, the vector similarity may be, for example, a cosine similarity.

In some embodiments, the server may separately obtain a feature descriptor of each target feature point, and obtain a feature descriptor of the representative feature point; and separately calculate a vector similarity between the feature descriptor of each target feature point and the feature descriptor of the representative feature point, and use each vector similarity as matching confidence between each target feature point and the representative feature point. For example, assuming that a specific feature point set includes image feature points A1, B1, and C1, and C1 is a representative feature point, respective feature descriptors of A1, B1, and C1 are separately obtained. A vector similarity between the feature descriptor of the image feature point A1 and the representative feature point C1 is calculated as matching confidence between the image feature point A1 and the representative feature point C1. A vector similarity between the feature descriptor of the image feature point B1 and the representative feature point C1 is calculated as matching confidence between the image feature point B1 and the representative feature point C1.

In the foregoing embodiment, a vector similarity between feature descriptors is calculated as matching confidence. Because a feature descriptor describes an image feature point, the obtained matching confidence is accurate.

In some embodiments, the determining a representative feature point from the feature point set includes: calculating an average feature point position corresponding to the feature point set based on a position in a corresponding image at which each image feature point in the feature point set is located; and determining an image feature point of which a distance from the average feature point position satisfies a distance condition in the feature point set, and using the determined image feature point as the representative feature point.

The distance condition includes one of the following: a distance from the average feature point position is less than or equal to a distance threshold, or a sorting position is before a sorting threshold in a case that the image feature points are sorted in ascending order of distances from the average feature point position.

In some embodiments, for each feature point set, the server may obtain the position in a corresponding image at which each image feature point in the feature point set is located, add position numerical values in the same dimension and then average the position numerical values to obtain a target numerical value of the dimension. The determining a target numerical value of each dimension means that the average feature point position corresponding to the feature point set is determined. For example, assuming that a specific feature point set includes image feature points A1, B1, and C1, a position in an image at which A1 is located is (x1, y1), a position in an image at which B1 is located is (x2, y2), and a position in an image at which C1 is located is (x3, y3), an average feature point position corresponding to the feature point set is ((x1+x2+x3)/3, (y1+y2+y3)/3).

For each feature point set, after calculating the average feature point position corresponding to the feature point set, the server may calculate a distance between the position of each image feature point in the feature point set and the average feature point position. An image feature point that satisfies the distance condition is screened based on the calculated distance, and the screened image feature point is determined as the representative feature point.

In a specific embodiment, the distance condition includes that a distance from the average feature point position is less than or equal to a distance threshold. After the server calculates a distance between each image feature point and an average feature point position corresponding to a feature point set, the distance is separately compared with the distance threshold. In a case that a distance between only one image feature point and an average feature point position corresponding to a feature point set is less than the distance threshold, the image feature point is determined as the representative feature point. In a case that distances between a plurality of image feature points and an average feature point position corresponding to a feature point set are less than the distance threshold, one of these image feature points may be selected as a representative feature point. For example, an image feature point with a smallest distance may be selected as a representative feature point.

In some embodiments, the distance condition includes a sorting position is before a sorting threshold in a case that the image feature points are sorted in ascending order of distances from the average feature point position. After calculating a distance between each image feature point and an average feature point position corresponding to the feature point set, the server may sort image feature points in ascending order based on distances, and select an image feature point that a sorting position is before the sorting threshold as a representative feature point. For example, in a case that the sorting threshold is 2, the image feature point sorted first may be selected as a representative feature point.

In the foregoing embodiment, an average feature point position corresponding to the feature point set is calculated based on a position in a corresponding image at which each image feature point in the feature point set is located. An image feature point of which a distance from the average feature point position satisfies a distance condition in the feature point set is determined, and the determined image feature point is used as the representative feature point. The determined representative feature point may greatly reflect an overall position characteristic of the feature point set.

In some embodiments, there are a plurality of feature point sets, and the determining a representative feature point from the feature point set includes: filtering out the feature point set, for each feature point set, in a case that the feature point set satisfies a filtering condition; and performing the operation of determining a representative feature point from the feature point set in a case that the feature point set does not satisfy the filtering condition.

In some embodiments, the filtering condition includes at least one of the following: a distance between an initial space feature point calculated based on the feature point set and a photographing camera of the plurality of image frames being greater than a first preset distance threshold; a distance between an initial space feature point calculated based on the feature point set and a photographing device of the plurality of image frames being less than a second preset distance threshold, and the second preset distance threshold being less than the first preset distance threshold; disparity calculated based on the feature point set being greater than a preset disparity threshold; or an average reprojection error calculated based on the feature point set being greater than a preset error threshold.

The initial space feature point refers to a space feature point determined based on the position in a corresponding image at which each image feature point in an unupdated feature point set is located. Filtering out the feature point set is removing the feature point set from a plurality of feature point sets.

In some embodiments, for each feature point set in the plurality of feature point sets, the server may calculate the initial space feature point based on the targeted feature point set, and may calculate a distance between the initial space feature point and a photographing device of the plurality of image frames. In a case that the distance is greater than a first preset distance threshold, to be specific, in a case that the space feature point is far away from the photographing device, the feature point set is filtered out. In a case that the distance is less than a second preset distance threshold, to be specific, in a case that the space feature point is close to the photographing device, the feature point set is filtered out. The second preset distance threshold is less that the first preset distance threshold.

Further, for each remaining feature point set after filtering in the previous operation, the server may further perform disparity calculation based on the feature point set. In a case that calculated disparity is greater than a preset disparity threshold, the feature point set is filtered out.

Further, for each remaining feature point set filtered out in the previous operation, the server may project the initial space feature point calculated based on the feature point set onto the image to which each image feature point in the feature point set belongs, calculate a distance between each image feature point and the projection feature point projected onto a corresponding image to obtain each projection distance, and calculate an average value of the projection distances to obtain an average reprojection error. In a case that the average reprojection error is greater than the preset error threshold, the feature point set is filtered out.

It may be understood that in other some embodiments, the filtering conditions in a filtering process may be a part of the foregoing conditions, and a filtering order based on each filtering condition may not be limited to the foregoing order.

For unfiltered feature point sets, the server may perform the foregoing operation of "determining a representative feature point from the feature point set" to determine the representative feature point from each feature point set, so that image feature points of these feature point sets are performed position optimization by using the method provided in the foregoing embodiment, to obtain each updated feature point set. Finally, a space feature point corresponding to each updated feature point set is determined based on a position in a corresponding image at which each image feature point in each updated feature point set is located, to obtain a plurality of space feature points to generate a feature map.

In the foregoing embodiment, a feature point set that satisfies the filtering condition is filtered out by setting the filtering condition. In this way, robustness of the feature map is further improved, and positioning accuracy is further improved during the feature map is used to assist in positioning.

Figure 4:
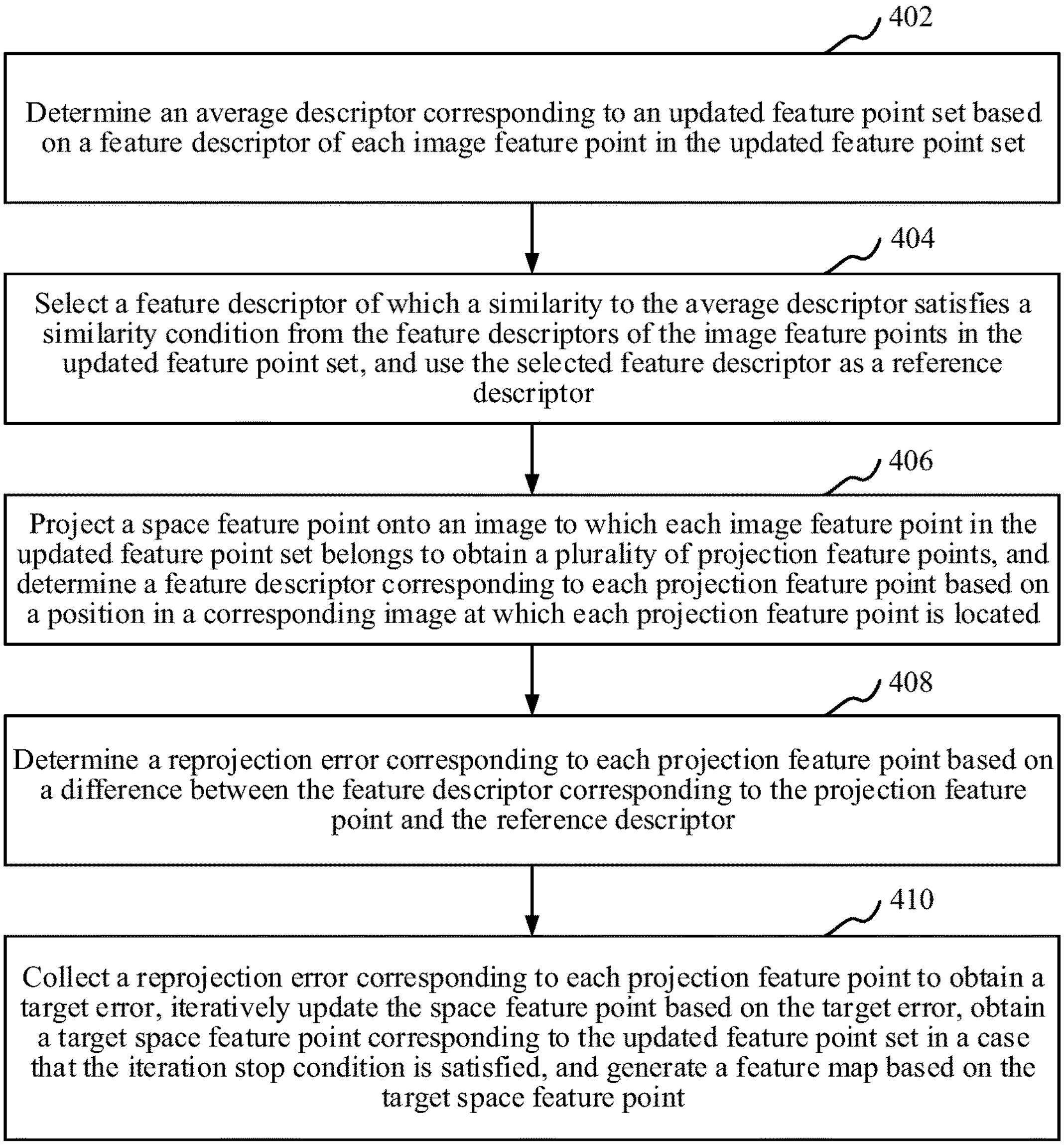
FIG. 4 is a schematic flowchart of generating a feature map based on a space feature point according to some embodiments.

In some embodiments, as shown in FIG. 4, the generating a feature map based on the space feature point includes the following operations.

Operation 402: Determine an average descriptor corresponding to the updated feature point set based on a feature descriptor of each image feature point in the updated feature point set.

In some embodiments, for each updated feature point set, the server may refer to the following Formula (2) to calculate an average descriptor corresponding to the feature point set.

$$u^j = \underset{f \in \{R^D\}}{\operatorname{argmin}} \sum_{f \in \{f_u^j\}} (f - u)^2 \quad \text{Formula (2)}$$

$u^j$ is the average descriptor. j represents a $j^{th}$ feature point set (the updated feature point set). f is a descriptor of an image feature point in the $j^{th}$ feature point set.

$$f_u^i$$

represents a feature descriptor set corresponding to the $j^{th}$ feature point set. $R^D$ represents D-dimensional real number space.

Operation 404: Select a feature descriptor of which a similarity to the average descriptor satisfies a similarity condition from the feature descriptors of the image feature points in the updated feature point set, and use the selected feature descriptor as a reference descriptor.

The similarity condition may be one of the following: a similarity is greater than a preset similarity threshold, or a sorting position is before a sorting threshold in a case that the image feature points are sorted in descending order based on similarities.

In a specific embodiment, the similarity condition includes that a similarity is greater than the preset similarity threshold. For each updated feature point set, after calculating the average descriptor corresponding to the feature point set, the server separately calculates a similarity between the feature descriptor of each image feature point in the feature point set and the average descriptor, and compares each similarity with the preset similarity threshold. If a similarity corresponding to only one image feature point is greater than the preset similarity threshold, the feature descriptor of the image feature point is determined as the reference descriptor. If similarities corresponding to a plurality of image feature points are greater than the preset similarity threshold, one of feature descriptors corresponding to these image feature points may be selected as the reference descriptor. For example, a feature descriptor with a highest similarity may be selected as the reference descriptor.

In some embodiments, the distance condition includes a sorting position is before the sorting threshold in a case that the image feature points are sorted in descending order based on the similarity. For each updated feature point set, after calculating the similarity between the feature descriptor of each image feature point in the feature point set and the average descriptor, the server may sort feature descriptors of image feature points in descending order based on the similarity. The reference descriptor of which a sorting position is before the sorting threshold is selected from the feature descriptors. For example, in a case that the sorting threshold is 2, the feature descriptor sorted first may be selected as the reference descriptor.

In some embodiments, the server may calculate the reference descriptor with reference to the following Formula (3).

$$f^j = \underset{f \in \{f_u^j\}}{\operatorname{argmin}} (u^j - f)^2 \quad \text{Formula (3)}$$

$f^j$ is the reference descriptor. j represents a $j^{th}$ feature point set (the updated feature point set). $u^j$ is the average descriptor. f represents the feature descriptor of each image feature point in the $j^{th}$ feature point set.

$$f_u^j$$

represents the feature descriptor set corresponding to the $j^{th}$ feature point set.

Operation 406: Project the space feature point onto an image to which each image feature point in the updated feature point set belongs to obtain a plurality of projection feature points, and determine a feature descriptor corresponding to each projection feature point based on a position in a corresponding image at which each projection feature point is located.

Operation 408: Determine a reprojection error corresponding to each projection feature point based on a difference between the feature descriptor corresponding to the projection feature point and the reference descriptor.

Operation 410: Collect a reprojection error corresponding to each projection feature point to obtain a target error, iteratively update the space feature point based on the target error, obtain a target space feature point corresponding to the updated feature point set in a case that the iteration stop condition is satisfied, and generate the feature map based on the target space feature point.

In some embodiments, for each updated feature point set, after determining a space feature point corresponding to each updated feature point set, the server may project the space feature point onto the image to which each image feature point in the feature point set belongs to obtain a plurality of projection feature points corresponding to the space feature point; may further determine a feature descriptor corresponding to each projection feature point based on a position in a corresponding image at which each projection feature point is located, then separately calculate a difference between each projection feature point and the reference descriptor corresponding to the updated feature point set calculated in operation 404 to obtain a respective reprojection error corresponding to each projection feature point; finally collect the reprojection errors to obtain a target error corresponding to the updated feature point set, and iteratively update a space feature point corresponding to the updated feature point set in a direction of minimizing the target error. In other words, an updated space feature point is used as a current space feature point, and operation 406 is performed again. In a case that operation 406 to operation 410 are performed iteratively until the iteration stop condition is satisfied, the obtained space feature point is the target space feature point, and the feature map may be generated based on the target space feature point. The iteration stop condition may be one of the following: the target error reaches a minimum value, a quantity of iterations reaches a preset quantity, or iteration duration reaches preset duration.

In a specific embodiment, during performing the foregoing operation 406 to operation 410, the server may calculate the target error with reference to Formula (4).

$$E_{FBA}^j = \sum_j \sum_{i \in Z(j)} \left(F_i[\pi(R_i P_j + t_i, C_i)] - f^j\right)^2 \quad \text{Formula (4)}$$

$$E_{FBA}^{j}$$

is the target error. j is a $j^{th}$ feature point set (the updated feature point set). Z(j) represents a set of images to which each image feature point in the $j^{th}$ feature point set belongs. i represents an $i^{th}$ image frame. $C_i$ represents a camera intrinsic parameter corresponding to the $i^{th}$ image frame. $P_j$ refers to a space feature point corresponding to the $j^{th}$ feature point set. $R_i$ is a rotation matrix corresponding to the $i^{th}$ image frame. $t_i$ is a translation matrix corresponding to the $i^{th}$ image frame. $f^j$ is a reference descriptor corresponding to the $j^{th}$ feature point set.

In the foregoing embodiment, the reference descriptor is determined. The space feature point is projected onto the image to which each image feature point in the updated feature point set belongs to obtain the plurality of projection feature points, and a feature descriptor corresponding to each projection feature point is determined based on a position in a corresponding image at which the projection feature point is located. A reprojection error corresponding to each projection feature point is determined based on a difference between the feature descriptor corresponding to the projection feature point and the reference descriptor. A respective reprojection error corresponding to each projection feature point is collected to obtain a target error, the space feature point is iteratively updated based on the target error, and a target space feature point is obtained in a case that the iteration stop condition is satisfied. A position of the space feature point is optimized. The feature map for positioning generated based on an optimized target space feature point can further improve positioning accuracy.

In some embodiments, the plurality of image frames are photographed by a camera mounted on a target moving device, and the foregoing feature map generation method further includes: obtaining inertial measurement data and speed measurement data of the target moving device during photographing the plurality of image frames, and using the inertial measurement data and the speed measurement data to calculate an initial pose of the to-be-positioned moving device; and determining pre-integration information based on the inertial measurement data, constructing a factor graph based on the pre-integration information and the speed measurement data, and adjusting the initial pose based on the factor graph to obtain a target pose; and the generating a feature map based on the space feature point includes: establishing a correspondence relationship between the space feature point and the target pose, and generating the feature map based on the correspondence relationship and the space feature point.

In some embodiments, the separately extracting image feature points from each image frame, and determining corresponding feature descriptors based on a position in a corresponding image at which the extracted image feature points are located includes: inputting the image into a trained feature extraction model, and outputting a first tensor corresponding to the image feature points and a second tensor corresponding to the feature descriptors by using the feature extraction model, the first tensor being used for describing a possibility of each feature point existing in each area of the image; performing non-maximum suppression processing on the image based on the first tensor to determine the image feature points of the image from the image; and converting the second tensor into a third tensor consistent with a size of the image, and determining a vector in the third tensor that matches a position in a corresponding image at which each image feature point is located as a descriptor corresponding to the image feature point.

In some embodiments, the server inputs the image into a trained feature extraction model, and outputs a first tensor corresponding to the image feature points and a second tensor corresponding to the feature descriptors by using the feature extraction model. The first tensor and the second tensor are both tensors with a plurality of channels, and a size of each channel is smaller than an original input image. A value of each position in the first tensor is used for describing a possibility of a feature point existing in each corresponding area in the original input image, that is, a probability value. For example, it is assumed that a size of an image inputted into the feature extraction model is H×W, an outputted first tensor may be H/N1×W/N1×X1, and a second tensor may be H/N2×W/N2×X2. N1, N2, X1, and X2 are all positive integers greater than one.

In some embodiments, in a case that non-maximum suppression processing is performed on the image based on the first tensor, the server may first convert the first tensor into a probability map with the same size as an input image. A local maximum value is searched in the probability map, and a position of the local maximum value is determined as a target position. Because the sizes of the probability map and the input image are consistent, a pixel point in the input image at the same position as the target position may be directly determined as an image feature point of the input image.

In some embodiments, it is considered that a process of converting the first tensor into the probability map with the same size as the input image is time-consuming. In a case that non-maximum suppression processing is performed on the image based on the first tensor, the server may implement the following operations.

1. Obtaining a maximum value of the first tensor at each position in a direction of the plurality of channels and a channel index corresponding to each maximum value, and respectively obtaining a third tensor and a fourth tensor.

In some embodiments, it is assumed that the first tensor includes N (where N is greater than or equal to 2) channels, the server may search for a maximum value in a direction of the N channels for each pixel position in the first tensor. The maximum value searched at each pixel position is used as a numerical value at a corresponding position in the third tensor, so that the third tensor may be obtained. In addition, a channel index of the maximum value searched at each pixel position is used as the numerical value at the corresponding position in the third tensor, so that the fourth tensor may be obtained.

2. Determining a target numerical value from the third tensor, and searching for a neighborhood of a position of the target numerical value in the third tensor, the neighborhood of the position the target numerical value including a plurality of target positions, and an image distance between a corresponding position of the target position in the image and a corresponding position of the position of target numerical value in the image being less than a preset distance threshold.

Figure 5:
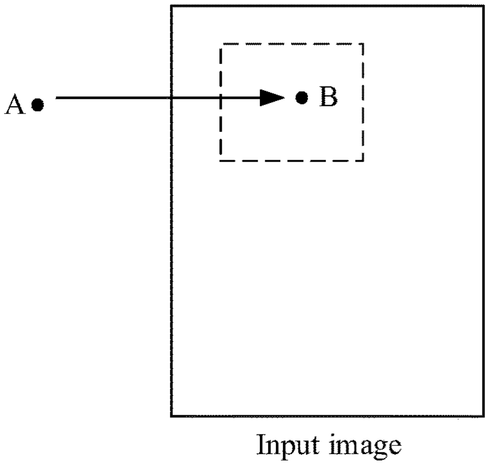
FIG. 5 is a schematic diagram of determining a corresponding position in an input image according to some embodiments.

In some embodiments, the server may sort numerical values in the third tensor in ascending order to obtain a numerical value set, and traverse the numerical values in the numerical value set in turn. For a traversed numerical value, it is determined whether the traversed numerical value is less than a preset threshold. If the traversed numerical value is less than the preset threshold, the next numerical value is continued to traverse, and if the traversed numerical value is greater than the preset threshold, the traversed numerical value is determined as the target numerical value, so that the neighborhood of the position of the target numerical value in the third tensor is searched. Because the size of the third tensor is reduced relative to the size of the original input image, and the image feature points refer to pixel point in the input image, the neighborhood at which the target numerical value is located needs to be determined based on a position in the original input image that corresponds to the pixel position of the target numerical value in the third tensor. To be specific, in a case that the neighborhood at which the target numerical value is located includes the plurality of target positions, an image distance between a corresponding position of each target position in the input image and a corresponding position of the target numerical value in the image is less than the preset distance threshold. In other words, the corresponding position of each target position in the input image falls within the neighborhood of a corresponding position in the image to which the position of the target numerical value corresponds. For example, as shown in FIG. 5, it is assumed that the position of the target numerical value is a point A, and a corresponding position of the point A in the input image is a point B. In a case that a dashed-line box in FIG. 5 represents a neighborhood of the point B, a corresponding position of each target position of the point A in the neighborhood of the third tensor in the input image falls within the dashed-line box.

In some embodiments, considering that features extracted by different channels in the first tensor are different, the position in the original image corresponding to the pixel position in the third tensor is related to a channel at which the pixel position is located. For a pixel position (i, j) in the third tensor, the index value is determined as D[i, j] at a corresponding position in the fourth tensor, and a corresponding position of the pixel position in the original image is (N×i+D[i, j]/8, N×j+D[i, j]%8). N is a reduction ratio of the third tensor relative to the original input image. For example, assuming that the original input image is 640×480, the first tensor is 80×60×64, the second tensor is 80×60×256, the third tensor is 80×60 (where each numerical value represents a maximum value of the first tensor in 64 dimensions, a decimal type), D is 80×60 (where each numerical value represents an index corresponding to a maximum value of the first tensor in 64 dimensions, an integer type), and the first tensor in 64 dimensions corresponds to every 8×8 area of the original image, a coordinate of the original image corresponding to a coordinate (32, 53, 35) of the first tensor is (32×8+35/8, 53×8+35%8)=(260, 427).

Therefore, a distance between corresponding positions of two pixel positions in the fourth tensor may be calculated as a distance between corresponding positions of two pixel positions in the original input image. For example, for a pixel position (i, j) and another pixel position (i+n, j+n) in the third tensor, a distance between corresponding positions of the two pixel positions in the original image may be obtained by calculating a distance between the pixel position (i, j) and the pixel position (i+n, j+n) in the fourth tensor.

3. Determining a target pixel point corresponding to the position of the target numerical value in the image as an image feature point of the image in a case that a search result indicates that the target numerical value is greater than a numerical value corresponding to another position in the neighborhood.

The target pixel point is determined from the image based on the position of the target numerical value and a corresponding channel index value. The channel index value is determined from the fourth tensor based on the position of the target numerical value. For example, assuming that a coordinate of the pixel position at which a specific target numerical value in the third tensor is located is (i, j), a corresponding position of the pixel position in the fourth tensor is also (i, j). Assuming that a numerical value at the position in the fourth tensor is D[i, j], in a case that a search result indicates that a target numerical value is greater than a corresponding numerical values at another position in the neighborhood, the pixel point with a coordinate (N×i+D[i, j]/8, N×j+D[i, j]%8) in the original input image is determined as a target pixel point corresponding to a position of the target numerical value. N is a reduction ratio of the third tensor relative to the original input image.

Figure 6:
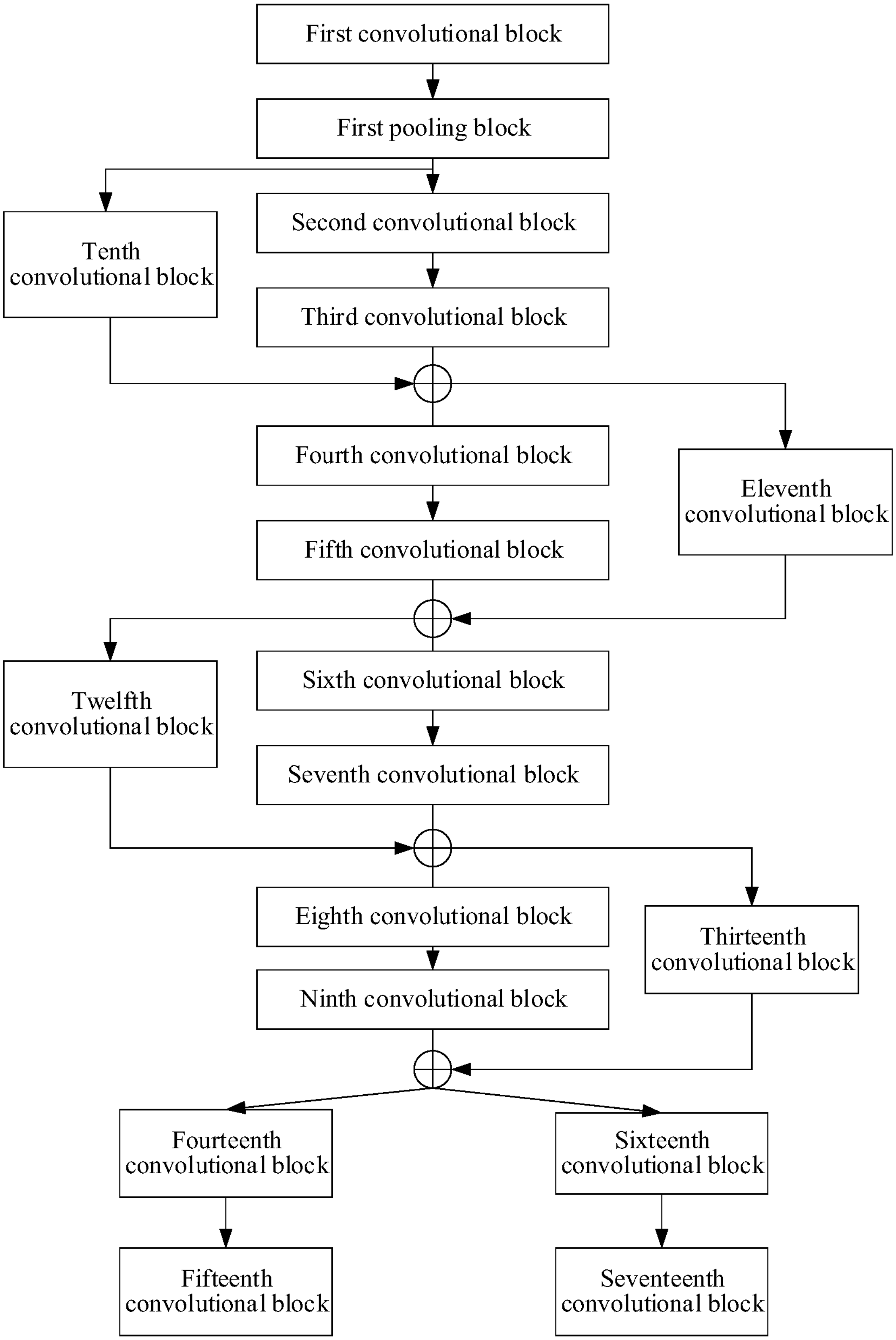
FIG. 6 is a schematic diagram of a structure of a feature extraction model according to some embodiments.

In a specific embodiment, a specific structure of the feature extraction model in the foregoing embodiment may be shown in FIG. 6. A first convolutional block is a 3×3 full convolutional layer, stride=1, and an output channel is 64. A first pooling block is a 3×3 largest pooling layer, stride=1, and an output channel is 64. A second convolutional block is a 3×3 full convolutional layer, stride=2, and an output channel is 64. A third convolutional block is a 3×3 full convolutional layer, stride=1, and an output channel is 64. A fourth convolutional block is a 3×3 full convolutional layer, stride=2, and an output channel is 64. A fifth convolutional block is a 3×3 full convolutional layer, stride=1, and an output channel is 64. A sixth convolutional block is a 3×3 full convolutional layer, stride=2, and an output channel is 128. A seventh convolutional block is a 3×3 full convolutional layer, stride=1, and an output channel is 128. An eighth convolutional block is a 3×3 full convolutional layer, stride=1, and an output channel is 128. A ninth convolutional block is a 3×3 full convolutional layer, stride=1, and an output channel is 128. A tenth convolutional block is a 1×1 full convolutional layer, stride=2, and an output channel is 64. An eleventh convolutional block is a 1×1 full convolutional layer, stride=2, and an output channel is 64. A twelfth convolutional block is a 1×1 full convolutional layer, stride=2, and an output channel is 128. A thirteenth convolutional block is a 1×1 full convolutional layer, stride=2, and an output channel is 128. A fourteenth convolutional block is a 3×3 full convolutional layer, stride=1, and an output channel is 128. A fifteenth convolutional block is a 3×3 full convolutional layer, stride=1, and an output channel is 64. A sixteenth convolutional block is a 3×3 full convolutional layer, stride=1, and an output channel is 128. A seventeenth convolutional block is a 3×3 full convolutional layer, stride=1, and an output channel is 256.

Assuming that a dimension of an input image is H×W, output of the fifteenth convolutional block of the feature extraction model is a tensor A of the feature point, the dimension is H/8×W/8×64, and a tensor B of a descriptor is outputted on the right, and the dimension is H/8×W/8×256, specific operations of extracting a feature point and a descriptor are as follows.

1. Obtaining a maximum value and an index corresponding to the maximum value in a 64-channel dimension to obtain two tensors C and D with H/8×W/8.
2. Arranging probability values in the tensor C in descending order as a set E, and setting a target set F for storing a subscript and confidence of a feature point.
3. Traversing the set E, and obtaining subscripts i and j of corresponding values in the tensor D.
4. Skipping traversing C[i, j] if C[i, j] is less than a specific threshold (for example, may be 0.05).
5. Traversing a neighborhood n of C[i, j].
6. Calculating a distance between D[i+n, j+n] (or D[i-n, j-n]) and D[i, j], that is, a distance between a coordinate (8×(i+n)+D[i+n, j+n]/8, 8×(j+n)+D[i+n, j+n]%8) on the original image and a coordinate (8×i+D[i, j]/8, 8×j+D[i, j]%8), and skipping this operation if the distance is greater than the specific threshold.

7. If C[i+n, j+n] (or C[i-n, j-n]) is greater than C[i, j], exiting the traversing in operation 5, otherwise continuing to perform operation 5.
8. If operation 5 is performed and C[i, j] is greater than any C[i+n, j+n] (or C[i-n, j-n]), putting C[i, j] and (i×8+D[i, j]/8, j×8+D[i, j]%8) in the target set F.
9. Continuing to perform operation 3.
10. Performing bilinear interpolation on the tensor B to obtain a tensor G, a dimension being H×W×256, and performing L2 norm calculation in a channel direction.
11. Searching for a corresponding descriptor from the tensor G based on a result of the target set F. In other words, for a subscript of each image feature point in the target set F, a position with the same subscript is found from the tensor G. A vector including values of each channel at the position is used as a feature descriptor of the image feature point, and the feature descriptor is a 256-dimensional vector. For example, for a subscript (10, 13) of a specific image feature point in the target set F, a position corresponding to (10, 13) is found from the tensor G. A vector including values of each channel at the position is determined as a feature descriptor of the image feature point.

In the foregoing embodiment, because there is no need to convert the first tensor into a probability map with the same size as the input image, extraction efficiency of an image feature point is improved.

In some embodiments, the obtaining a plurality of image frames photographed for a target scene includes: obtaining a plurality of original image frames photographed for the target scene by a fisheye camera, and performing distortion correction on the plurality of original image frames to obtain the plurality of image frames photographed for the target scene.

In some embodiments, the server obtains the plurality of image frames photographed for the target scene by the fisheye camera. An imaging model of the fisheye camera is approximately a unit spherical projection model. Generally, an imaging process of the fisheye camera is divided into two operations. Firstly, a three-dimensional space point is linearly projected onto a virtual unit sphere. Then, a point on the unit sphere is projected onto an image plane. The process is nonlinear. Because a design of the fisheye camera introduces distortion, an image formed by using the fisheye camera has distortion. Because radial distortion is very serious, a distortion model of the fisheye camera mainly considers radial distortion. A projection function of the fisheye camera is designed to project a huge scene to a limited image plane as much as possible. A design model of the fisheye camera may be roughly divided into four types: an equidistant projection model, an isometric projection model, an orthogonal projection model, and a stereoscopic projection model based on different projection functions. In some embodiments, any one of the four models may be used to perform distortion correction on the plurality of original image frames photographed by the fisheye camera to obtain the plurality of image frames photographed for the target scene.

In the foregoing embodiment, because the plurality of image frames are photographed by the fisheye camera, the fisheye camera has a wider viewing angle than a pinhole camera, may sense more environmental information, and extract more image feature points, further improving robustness of the generated feature map and further improving positioning accuracy.

Figure 7:
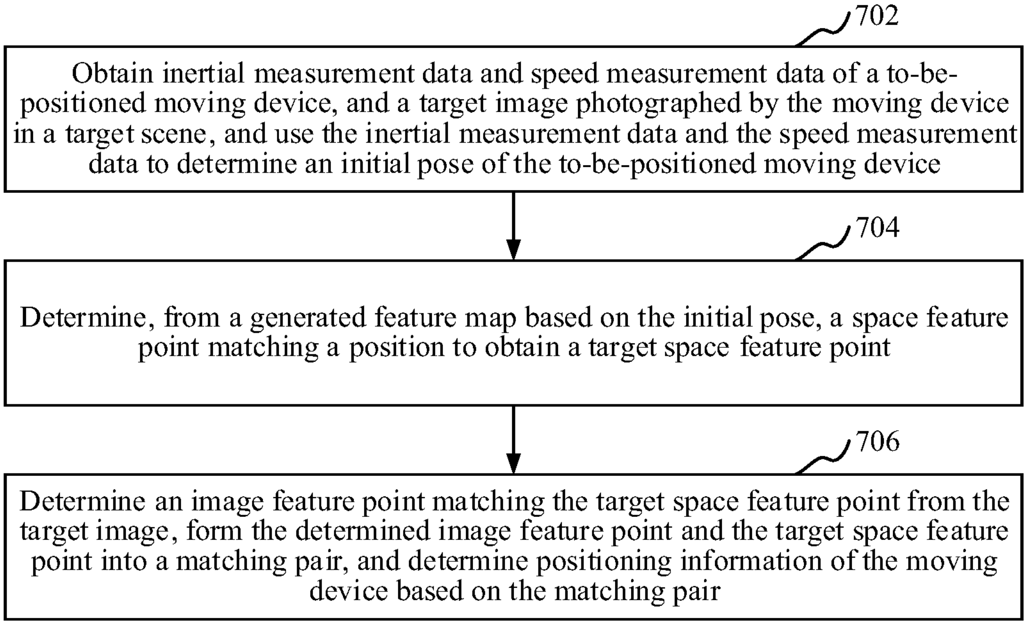
FIG. 7 is a schematic flowchart of operations of determining positioning information according to some embodiments.

In some embodiments, FIG. 7 is a schematic flowchart of determining positioning information by using a feature map generated in some embodiments, including the following operations.

Operation 702: Obtain inertial measurement data and speed measurement data of a to-be-positioned moving device, and a target image photographed by the moving device in the target scene, and use the inertial measurement data and the speed measurement data to determine an initial pose of the to-be-positioned moving device.

The inertial measurement data may be data measured by an inertial measurement unit (IMU). The speed measurement data may be data measured by a speed sensor. For example, in a case that the to-be-positioned moving device is a vehicle, the speed measurement data may be data measured by a wheel speedometer. The inertial measurement data and speed measurement data here are data measured when the to-be-positioned moving device moves in the target scene.

In some embodiments, the server may receive the inertial measurement data and the speed measurement data, and the target image photographed by the to-be-positioned moving device in the target scene that are sent by the to-be-positioned moving device, and calculate the initial pose of the to-be-positioned moving device by using the inertial measurement data and the speed measurement data based on a preset kinematic model. The preset kinematic model may reflect a relationship between a vehicle position, speed, acceleration, and the like, and time. A specific form of the model is not limited herein. In some embodiments, proper settings may be made according to a requirement. For example, an existing bicycle model may be improved to obtain a needed model.

Operation 704: Determine, from the generated feature map based on the initial pose, a space feature point matching a position to obtain a target space feature point.

In some embodiments, the server may find, from the feature map, based on the position represented by the initial pose, a space feature point matching a position as the target space feature point. In some embodiments, the feature map further includes a corresponding pose storing each space feature point. The pose corresponding to the space feature point may be a pose of the moving device during photographing the plurality of image frames in a process of generating the feature map. Further, in a process of determining the positioning information, the server may compare the initial pose of the to-be-positioned moving device with the pose corresponding to each space feature point, and determine a space feature point corresponding to a pose with a highest matching degree as the target feature point.

Operation 706: Determine an image feature point matching the target space feature point from the target image, form the determined image feature point and the target space feature point into a matching pair, and determine positioning information of the moving device based on the matching pair.

In some embodiments, the server may compare the descriptor corresponding to the target space feature point with the feature descriptor corresponding to each image feature point on the target image, determine an image feature point corresponding to the feature descriptor with a highest similarity as an image feature point matching the target space feature point, and form the determined image feature point and the target space feature point into a matching pair, and may further determine positioning information of the moving device based on the matching pair. The descriptor corresponding to the target space feature point may be an average value of feature descriptors of image feature points in the feature point set corresponding to the target space feature point.

In some embodiments, a PnP algorithm may be used to determine the positioning information based on the matching pair. The PnP algorithm is an existing method. Details are not be described herein. In some embodiments, the determining positioning information based on the matching pair specifically includes: projecting the space feature point in the matching pair onto the target image to obtain a projection feature point; calculating a reprojection error based on the projection feature point and the image feature point in the matching pair; and determining a pose corresponding to a minimum value of a least square function of the reprojection error as a corrected pose, and correcting the initial pose by using the corrected pose to obtain the positioning information. Further, the server may return the positioning information to the to-be-positioned moving device.

In the foregoing embodiment, because during generating the feature map, the position of the image feature point is optimized based on the feature descriptor of the image feature point, and the generated feature map is robust, so that positioning accuracy is greatly improved by using the feature map during positioning.

In some embodiments, the feature map generation method may be applied to a parking application scenario, and specifically includes the following operations.

I. A Server Generates a Feature Map.

1. Obtaining a plurality of original image frames photographed for the target scene by a fisheye camera, and performing distortion correction on the plurality of original image frames to obtain the plurality of image frames photographed for the target scene.

In some embodiments, a target vehicle equipped with the fisheye camera may run in a garage. An environment in the garage is photographed by the fisheye camera to obtain a plurality of original image frames, and the plurality of original image frames are sent to the server. The server performs distortion correction on the plurality of original image frames to obtain a plurality of image frames photographed for the target scene.

The target vehicle here and a to-be-parked vehicle may be the same vehicle or different vehicles.

2. Separately extracting image feature points from each image frame, and determining corresponding feature descriptors based on a position in a corresponding image at which the extracted image feature points are located.

In some embodiments, for each image frame, the server may input the image into a trained feature extraction model, and output a first tensor corresponding to the image feature points and a second tensor corresponding to the feature descriptors by using the feature extraction model, the first tensor being used for describing a possibility of each feature point existing in each area of the image; perform non-maximum suppression processing on the image based on the first tensor to determine the image feature points of the image from the image; and convert the second tensor into a third tensor consistent with a size of the image, and determine a vector in the third tensor that matches a position in a corresponding image at which each image feature point is located as a descriptor corresponding to the image feature point.

The first tensor includes a plurality of channels, and the performing non-maximum suppression processing on the image based on the first tensor to determine the image feature points of the image from the image includes: obtaining, in a direction of the plurality of channels, a maximum value at each position in the first tensor and a channel index corresponding to each maximum value to separately obtain the third tensor and a fourth tensor; determining a target numerical value from the third tensor, and searching for a neighborhood of a position of the target numerical value in the third tensor, the neighborhood of the position the target numerical value including a plurality of target positions, and an image distance between a position in the image corresponding to each target position and a position in the image corresponding to the position of the target numerical value being less than a preset distance threshold; and determining a target pixel point in the image corresponding to the position of the target numerical value as each image feature point of the image in a case that a search result indicates that the target numerical value is greater than a numerical value corresponding to another position in the neighborhood. The target pixel point is determined from the image based on the position of the target numerical value and a corresponding channel index value. The channel index value is determined from the fourth tensor based on the position of the target numerical value.

3. Forming image feature points with a matching relationship in the image feature points of each image frame into a feature point set.

4. Filtering out the feature point set, for each feature point set, in a case that the feature point set satisfies a filtering condition; performing operation 5 in a case that the feature point set does not satisfy the filtering condition. The filtering condition includes at least one of the following: a distance between an initial space feature point calculated based on the feature point set and a photographing device of the plurality of image frames being greater than a first preset distance threshold; a distance between an initial space feature point calculated based on the feature point set and a photographing device of the plurality of image frames being less than a second preset distance threshold, and the second preset distance threshold being less than the first preset distance threshold; disparity calculated based on the feature point set being greater than a preset disparity threshold; or an average reprojection error calculated based on the feature point set being greater than a preset error threshold.

5. Determining a representative feature point from the feature point set, and calculating a difference between a feature descriptor corresponding to a remaining image feature point in the feature point set and a feature descriptor corresponding to the representative feature point.

In some embodiments, the server determines a representative feature point from the feature point set by using the following steps: calculating an average feature point position corresponding to the feature point set based on a position in a corresponding image at which each image feature point in the feature point set is located; and determining an image feature point of which a distance from the average feature point position satisfies a distance condition in the feature point set, and using the determined image feature point as the representative feature point. The distance condition includes one of the following: a distance from the average feature point position is less than or equal to a distance threshold, or a sorting position is before a sorting threshold in a case that the image feature points are sorted in ascending order of distances from the average feature point position.

6. Separately using each remaining image feature point in the feature point set as a target feature point, and separately calculating matching confidence between each target feature point and the representative feature point; calculating a position error corresponding to each target feature point based on the matching confidence and difference corresponding to each target feature point; and collecting the position error corresponding to each target feature point to obtain the position error of the feature point set.

The separately calculating matching confidence between each target feature point and the representative feature point includes: separately obtaining a feature descriptor of each target feature point, and obtaining a feature descriptor of the representative feature point; and separately calculating a vector similarity between the feature descriptor of each target feature point and the feature descriptor of the representative feature point, and using each vector similarity as matching confidence between each target feature point and the representative feature point.

7. Iteratively updating the remaining image feature point in the feature point set based on the position error, and obtaining an updated feature point set in a case that an iteration stop condition is satisfied.

In some embodiments, the server may update a position of the remaining image feature point in the feature point set by using a gradient descent algorithm in a direction of minimizing the position error, determine a descriptor corresponding to the obtained image feature point from the third tensor, then recalculate the position error, and repeat the process continuously until the iteration stop condition is satisfied.

By using the foregoing operations, a plurality of updated feature point sets may be obtained. The server may determine whether there is a feature point set satisfying the filtering condition in these feature point sets again, filter out the feature point set satisfying the filtering condition, and continue to perform the subsequent operations for a remaining feature point set after filtering out. For the filtering condition, refer to the description in the foregoing embodiment.

8. Determining a space feature point corresponding to the updated feature point set based on a position in a corresponding image at which each image feature point in the updated feature point set is located, so that a plurality of space feature points may be obtained.

9. Optimizing a position of each space feature point, specifically including the following operations.

9.1 For each space feature point, determining an average descriptor corresponding to the updated feature point set based on a feature descriptor of each image feature point in the updated feature point set corresponding to the space feature point.

9.2 Selecting a feature descriptor of which a similarity to the average descriptor satisfies a similarity condition from the feature descriptors of the image feature points in the updated feature point set, and using the selected feature descriptor as a reference descriptor.

9.3 Projecting the space feature point onto an image to which each image feature point in the updated feature point set belongs to obtain a plurality of projection feature points, and determining a feature descriptor corresponding to each projection feature point based on a position in a corresponding image at which each projection feature point is located.

9.4 Determining a reprojection error corresponding to each projection feature point based on a difference between the feature descriptor corresponding to the projection feature point and the reference descriptor.

9.5. Collecting a respective reprojection error corresponding to each projection feature point to obtain a target error, iteratively updating the space feature point based on the target error, and obtaining a target space feature point in a case that the iteration stop condition is satisfied. The target space feature point is a space feature point after position optimization.

10. Generating a feature map based on each optimized target space feature point, and storing the feature map.

II Parking Based on the Feature Map

1. Downloading the feature map from the server in a case that a to-be-parked vehicle enters a garage entrance. A user may input a to-be-parked target parking position, so that the vehicle may plan a parking route from the garage entrance to the target parking position for the user based on the feature map.
2. The vehicle automatically runs based on the planned parking route. During running, the vehicle is positioned in the following ways:
2.1 Obtaining current inertial measurement data by an IMU, obtaining current speed measurement data by a wheel speed sensor, and obtaining a current target image photographed by a camera mounted on the vehicle.
2.2 Using the inertial measurement data and the speed measurement data to determine a current initial pose.
2.3 Determining, from the stored feature map based on the current initial pose, a space feature point matching a position, to obtain a target space feature point.
2.4 Determining an image feature point matching the target space feature point from the target image, forming the determined image feature point and the target space feature point into a matching pair, and determining a current position based on the matching pair.
3. Automatically running into the target parking position to complete parking in a case that the current position is the target parking position.

In some embodiments, the feature map generation method may be applied to an application scenario of vacuum cleaning robot automatic cleaning. In this application scenario, a vacuum cleaning robot first walks in a to-be-cleaned area, collects a plurality of image frames in the area, and generates a feature map based on the feature map generation method provided in some embodiments. Further, in subsequent automatic cleaning processes, a cleaning route may be planned by using the feature map, and in an automatic cleaning process, automatic positioning is performed based on the feature map, to perform a cleaning task based on the planned cleaning route.

It is to be understood that although various operations in flowcharts according to each embodiment are displayed in sequence based on indication of arrows, the operations are not necessarily performed in sequence based on a sequence indicated by the arrows. Unless otherwise explicitly specified herein, execution of the operations is not strictly limited, and the operations may be performed in other sequences. In addition, at least some of the operations in the flowcharts according to each embodiment may include a plurality of operations or a plurality of stages. These operations or stages are not necessarily performed at a same time instant, but may be performed at different time instants. These operations or stages are not necessarily performed in sequence, and the operations or stages may be performed in turn or alternately with other operations or at least some operations or stages of other operations.

Based on the same inventive concept, some embodiments further provide a feature map generation apparatus for implementing the foregoing feature map generation method. The solutions to the problem provided by the apparatus are similar to the solutions described in the foregoing method. Therefore, for a specific limitation of one or more feature map generation apparatus embodiments and positioning information determining apparatus provided below, refer to a limitation of the feature map generation method above. Details are not described again herein.

Figure 8:
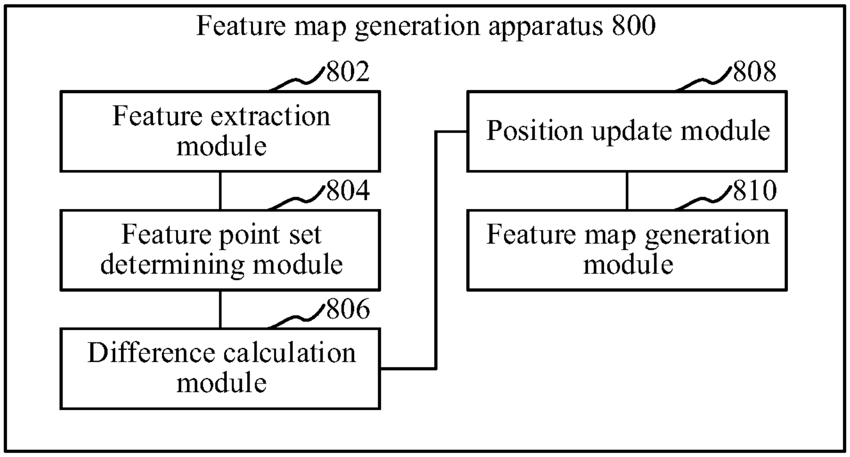
FIG. 8 is a block diagram of a structure of a feature map generation apparatus according to some embodiments.

In some embodiments, as shown in FIG. 8, a feature map generation apparatus 800 is provided, and includes:

a feature extraction module 802, configured to obtain a plurality of image frames photographed for a target scene, separately extracting image feature points from each image frame, and determine corresponding feature descriptors based on a position in a corresponding image at which the extracted image feature points are located;

a feature point set determining module 804, configured to form image feature points with a matching relationship in the image feature points of each image frame into a feature point set;

a difference calculation module 806, configured to determine a representative feature point from the feature point set, and calculate a difference between a feature descriptor corresponding to a remaining image feature point in the feature point set and a feature descriptor corresponding to the representative feature point;

a position update module 808, configured to determine a position error of the feature point set based on the calculated difference, iteratively update the remaining image feature point in the feature point set based on the position error, and obtain an updated feature point set in a case that an iteration stop condition is satisfied;

a feature map generation module 810, configured to determine a space feature point corresponding to the updated feature point set based on a position in a corresponding image at which each image feature point in the updated feature point set is located, and generate a feature map based on the space feature point, the feature map being used for positioning a to-be-positioned moving device in the target scene.

In the foregoing feature map generation apparatus, a plurality of image frames photographed for a target scene are obtained, image feature points from each image frame are separately extracted, and corresponding feature descriptors based on a position in a corresponding image at which the extracted image feature points are located are determined. Image feature points with a matching relationship in the image feature points of each image frame are formed into a feature point set. A representative feature point is determined from the feature point set, and a difference between a feature descriptor corresponding to a remaining image feature point in the feature point set and a feature descriptor corresponding to the representative feature point is calculated. A position error of the feature point set is determined based on the calculated difference, the remaining image feature point in the feature point set is iteratively updated based on the position error, and an updated feature point set is obtained in a case that an iteration stop condition is satisfied. A space feature point corresponding to the updated feature point set is determined based on a position in a corresponding image at which each image feature point in the updated feature point set is located, and a feature map is generated based on the space feature point. Because in a process of generating the feature map, the position of the image feature point is optimized based on the feature descriptor of the image feature point, so that the generated feature map may be robust, to greatly improve positioning accuracy by using the feature map during positioning.

In some embodiments, the position update module 808 is configured to separately use each remaining image feature point in the feature point set as a target feature point, and separately calculate matching confidence between each target feature point and the representative feature point; calculate a position error corresponding to each target feature point based on the matching confidence and difference corresponding to each target feature point; and collect the position error corresponding to each target feature point to obtain the position error of the feature point set.

In some embodiments, the position update module 808 is further configured to separately obtain a feature descriptor of each target feature point, and obtain a feature descriptor of the representative feature point; and separately calculate a vector similarity between the feature descriptor of each target feature point and the feature descriptor of the representative feature point, and use each vector similarity as matching confidence between each target feature point and the representative feature point.

In some embodiments, the difference calculation module 806 is further configured to calculate an average feature point position corresponding to the feature point set based on a position in a corresponding image at which each image feature point in the feature point set is located; and determine an image feature point of which a distance from the average feature point position satisfies a distance condition in the feature point set, and use the determined image feature point as the representative feature point. The distance condition includes one of the following: a distance from the average feature point position is less than or equal to a distance threshold, or a sorting position is before a sorting threshold in a case that the image feature points are sorted in ascending order of distances from the average feature point position.

In some embodiments, there are a plurality of feature point sets, and the difference calculation module 806 is further configured to filter out the feature point set, for each feature point set, in a case that the feature point set satisfies a filtering condition; and perform the operation of determining a representative feature point from the feature point set in a case that the feature point set does not satisfy the filtering condition. The filtering condition includes at least one of the following: a distance between an initial space feature point calculated based on the feature point set and a photographing device of the plurality of image frames being greater than a first preset distance threshold; a distance between an initial space feature point calculated based on the feature point set and a photographing device of the plurality of image frames being less than a second preset distance threshold, and the second preset distance threshold being less than the first preset distance threshold; disparity calculated based on the feature point set being greater than a preset disparity threshold; or an average reprojection error calculated based on the feature point set being greater than a preset error threshold.

In some embodiments, the feature map generation module is further configured to: determine an average descriptor corresponding to the updated feature point set based on a feature descriptor of each image feature point in the updated feature point set; select a feature descriptor of which a similarity to the average descriptor satisfies a similarity condition from the feature descriptors of the image feature points in the updated feature point set, and use the selected feature descriptor as a reference descriptor; project the space feature point onto a corresponding image to which each image feature point in the updated feature point set belongs to obtain a plurality of projection feature points, and determine a feature descriptor corresponding to each projection feature point based on a position in a corresponding image at which each projection feature point is located; determine a reprojection error corresponding to each projection feature point based on a difference between the feature descriptor corresponding to the projection feature point and the reference descriptor; and collect a reprojection error corresponding to each projection feature point to obtain a target error, iteratively update the space feature point based on the target error, obtain a target space feature point corresponding to the updated feature point set in a case that the iteration stop condition is satisfied, and generate the feature map based on the target space feature point.

In some embodiments, the feature extraction module is further configured to input the image into a trained feature extraction model, and output a first tensor corresponding to the image feature points and a second tensor corresponding to the feature descriptors by using the feature extraction model, the first tensor being used for describing a possibility of each feature point existing in each area of the image; perform non-maximum suppression processing on the image based on the first tensor to determine the image feature points of the image from the image; and convert the second tensor into a third tensor consistent with a size of the image, and determine a vector in the third tensor that matches a position in a corresponding image at which each image feature point is located as a descriptor corresponding to the image feature point.

In some embodiments, the first tensor includes a plurality of channels, and the feature extraction module is further configured to: obtain, in a direction of the plurality of channels, a maximum value at each position in the first tensor and a channel index corresponding to each maximum value to separately obtain the third tensor and a fourth tensor; determine a target numerical value from the third tensor, and search for a neighborhood of a position of the target numerical value in the third tensor, the neighborhood of the position the target numerical value including a plurality of target positions, and an image distance between a position in the image corresponding to each target position and a position in the image corresponding to the position of the target numerical value being less than a preset distance threshold; and determine a target pixel point in the image corresponding to the position of the target numerical value as each image feature point of the image in a case that a search result indicates that the target numerical value is greater than a numerical value corresponding to another position in the neighborhood, the target pixel point being determined from the image based on the position of the target numerical value and a corresponding channel index value, and the channel index value being determined from the fourth tensor based on the position of the target numerical value.

In some embodiments, the feature extraction module is further configured to: obtain a plurality of original image frames photographed for the target scene by a fisheye camera, and perform distortion correction on the plurality of original image frames to obtain the plurality of image frames photographed for the target scene.

In some embodiments, the foregoing apparatus further includes a positioning information determining module, configured to initially obtain inertial measurement data and speed measurement data of the to-be-positioned moving device, and a target image photographed by the moving device in the target scene, and use the inertial measurement data and the speed measurement data to determine an initial pose of the to-be-positioned moving device; determine, from the generated feature map based on the initial pose, a space feature point matching a position, to obtain a target space feature point; determine an image feature point matching the target space feature point from the target image, form the determined image feature point and the target space feature point into a matching pair, and determine positioning information of the moving device based on the matching pair.

All or some of the modules in the foregoing feature map generation apparatus may be implemented by software, hardware, and a combination thereof. The modules may be embedded in or independent of a processor in a computer device in the form of hardware, and may be stored in a memory in the computer device in the form of software, so that the processor may call and perform operations corresponding to each module.

In some embodiments, a computer device is provided. The computer device may be a server, and an internal structure diagram of the computer device may be shown in FIG. 9. The computer device includes a processor, a memory, an input/output interface (I/O for short), and a communication interface. The processor and the memory are connected to the input/output interface via a system bus. The communication interface is connected to the system bus via the input/output interface The processor of the computer device is configured to provide a computation and control capability. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is used for storing feature map data. The input/output interface of the computer device is configured to exchange information between the processor and an external device. The communication interface of the computer device is configured to communicate with an external terminal. The computer program, when executed by the processor, implements a feature map generation method.

In some embodiments, a computer device is provided. The computer device may be a terminal mounted in the foregoing moving device, for example, may be an on-board terminal, and an internal structure diagram of the computer device may be shown in FIG. 10. The computer device includes a processor, a memory, an input/output interface, a communication interface, a display unit, and an input apparatus. The processor and the memory are connected to the input/output interface via a system bus. The communication interface, the display unit, and the input apparatus are connected to the system bus via the input/output interface. The processor of the computer device is configured to provide a computation and control capability. The memory of the computer device includes a non-volatile storage medium and an internal memory. The non-volatile storage medium stores an operating system and a computer program. The internal memory provides an environment for running of the operating system and the computer program in the non-volatile storage medium. The input/output interface of the computer device is configured to exchange information between the processor and an external device. The communication interface of the computer device is configured to communicate with an external terminal in a wired or wireless manner. A wireless manner may be implemented by Wi-Fi, a mobile cellular network, near field communication (NFC), or another technology. The computer program, when executed by the processor, implements a feature map generation method. The display unit of the computer device is configured to form a visually visible picture, and may be a display, a projection apparatus, or a virtual reality imaging apparatus. The display may be a liquid crystal display or an e-ink display. An input apparatus of the computer device may be a touch layer covering the display, may be a button, a trackball, or a touchpad disposed on a housing of the computer device, or may be an external keyboard, touchpad, mouse, or the like.

Figure 9:
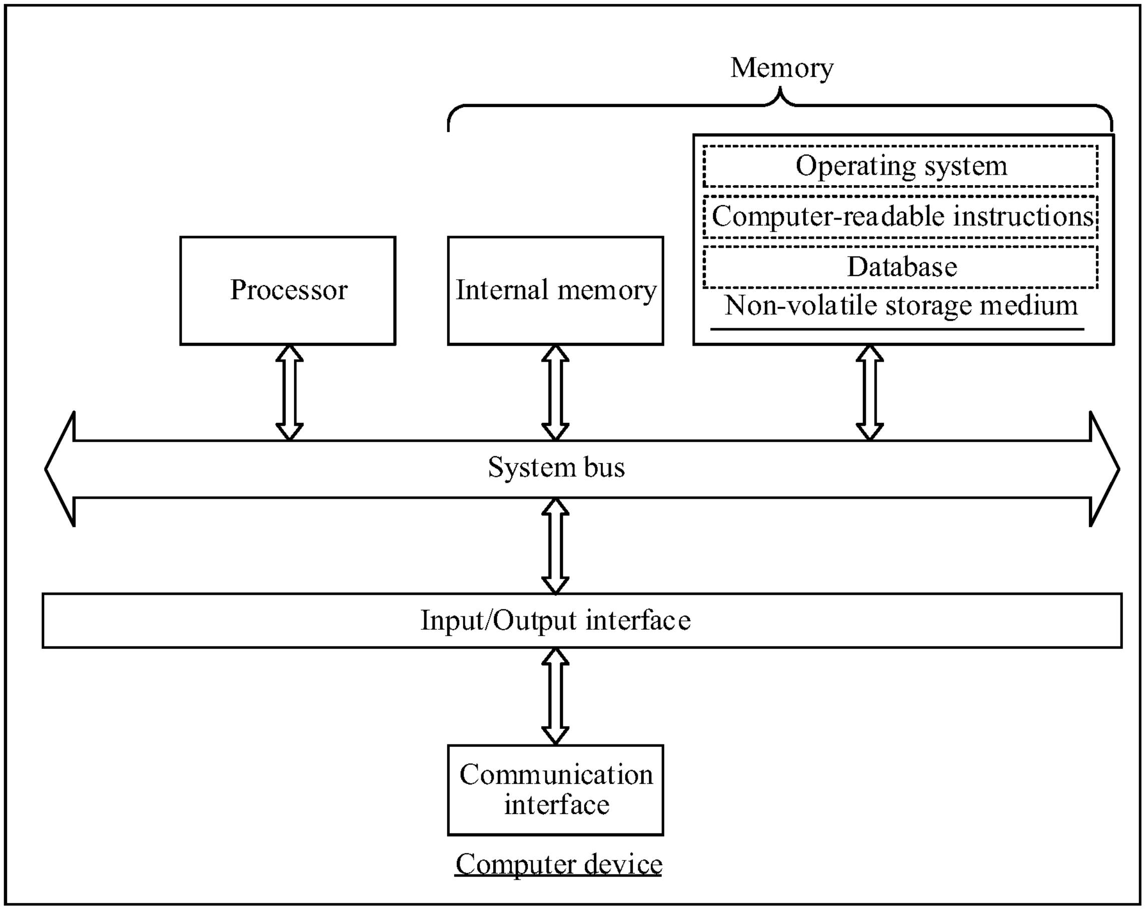
FIG. 9 is a diagram of an internal structure of a computer device according to some embodiments.
Figure 10:
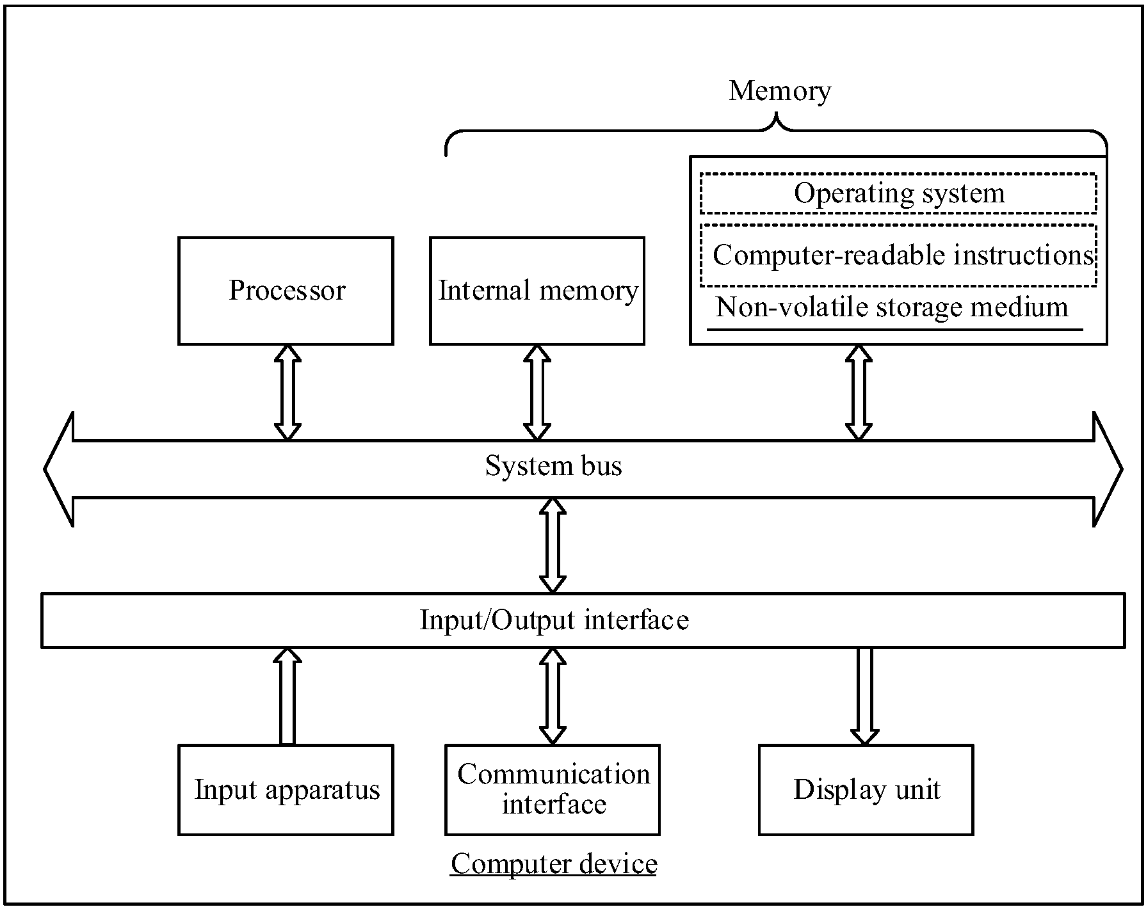
FIG. 10 is a diagram of an internal structure of a computer device according to some embodiments.

A person skilled in the art may understand that the structure shown in FIG. 9 and FIG. 10 are merely a block diagram of a partial structure according to some embodiments, and does not constitute a limitation. In some embodiments, the computer device may include more or fewer components than those shown in the figure, or some components may be combined, or a different component deployment may be used.

In some embodiments, a computer device is provided, including a memory and a processor, the memory having computer-readable instructions stored therein, and the computer-readable instructions, when executed by the processor, implementing operations of the foregoing feature map generation method.

In some embodiments, a computer-readable storage medium is provided, having computer-readable instructions stored thereon, and the computer-readable instructions, when executed by a processor, implementing operations of the foregoing feature map generation method.

In some embodiments, a computer program product is provided, including computer-readable instructions, and the computer-readable instructions, when executed by a processor, implementing operations of the foregoing feature map generation method.

User information (including but not limited to user device information, user personal information, and the like) and data (including but not limited to data used for analysis, stored data, displayed data, and the like), included in some embodiments are information and data that all authorized by a user or fully authorized by all parties. Collection, use, and processing of related data need to comply with relevant laws, regulations, and standards of relevant countries and regions.

A person of ordinary skill in the art may understand that all or some of procedures of the method in the foregoing embodiments may be implemented by computer-readable instructions instructing relevant hardware. The computer-readable instructions may be stored in a non-volatile computer-readable storage medium. When the computer-readable instructions are executed, the procedures of the method embodiments may be implemented. References to the memory, the database, or another medium used in some embodiments may all include at least one of a non-volatile or a volatile memory. The non-volatile memory may include a read-only memory (ROM), a magnetic tape, a floppy disk, a flash memory, an optical memory, a high-density embedded non-volatile memory, a resistive random access memory (ReRAM), a magneto-resistive random access memory (MRAM), a ferroelectric random access memory (FRAM), a phase change memory (PCM), a graphene memory, and the like. The volatile memory may include a random access memory (RAM), an external cache, or the like. As description and not a limitation, the RAM may be in various forms, such as a static random access memory (SRAM) or a dynamic random access memory (DRAM). The database involved in various embodiments may include at least one of a relational database and a non-relational database. The non-relational database may include a blockchain-based distributed database and the like, which is not limited herein. The processor involved in various embodiments provided in some embodiments may be a general processor, a central processing unit, a graphics processor, a digital signal processor, a programmable logic, a data processing logic based on quantum computing, or the like, which is not limited herein.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A feature map generation method, performed by a computer device, comprising:

obtaining a plurality of image frames photographed for a target scene, separately extracting image feature points from each image frame of the plurality of image frames, and determining corresponding feature descriptors based on a position in a corresponding image at which the extracted image feature points are located;

forming image feature points with a matching relationship in the image feature points of the each image frame into a feature point set;

determining a representative feature point from the feature point set, and calculating a difference between a feature descriptor corresponding to a remaining image feature point in the feature point set and a feature descriptor corresponding to the representative feature point;

determining a position error of the feature point set based on the difference, iteratively updating the remaining image feature point in the feature point set based on the position error, and obtaining an updated feature point set based on an iteration stop condition being satisfied; and determining a space feature point corresponding to the updated feature point set based on a position in the corresponding image at which each image feature point in the updated feature point set is located, and generating a feature map based on the space feature point, the feature map positioning a to-be-positioned moving device in the target scene, wherein determining the position error comprises:

separately using each remaining image feature point in the feature point set as a target feature point, and separately calculating matching confidence between each target feature point and the representative feature point; and calculating a position error corresponding to each target feature point based on the matching confidence and difference corresponding to each feature point.

2. The feature map generation method according to claim 1, wherein determining the position error comprises:

collecting the position error corresponding to each target feature point to obtain the position error of the feature point set.

3. The feature map generation method according to claim 1, wherein separately calculating the matching confidence between each target feature point and the representative feature point comprises:

separately obtaining a feature descriptor of each target feature point, and obtaining a feature descriptor of the representative feature point; and separately calculating a vector similarity between the feature descriptor of each target feature point and the feature descriptor of the representative feature point, and using each vector similarity as matching confidence between each target feature point and the representative feature point.

4. The feature map generation method according to claim 1, wherein determining the representative feature point from the feature point set comprises:

calculating an average feature point position corresponding to the feature point set based on a position in the corresponding image at which each image feature point in the feature point set is located; and determining an image feature point of which a distance from the average feature point position satisfies a distance condition in the feature point set, and using the determined image feature point as the representative feature point, the distance condition comprising one of the following: a distance from the average feature point position being less than or equal to a distance threshold, or a sorting position being before a sorting threshold based on the image feature points being sorted in ascending order of distances from the average feature point position.

5. The feature map generation method according to claim 1, wherein the feature point set includes a plurality of feature point sets, and determining the representative feature point from the feature point set comprises:

filtering out the feature point set, for each feature point set of the plurality of feature point sets, based on the feature point set satisfying a filtering condition, the filtering condition comprising at least one of the following:

a distance between an initial space feature point calculated based on the feature point set and a photographing device of the plurality of image frames being greater than a first preset distance threshold;

a distance between an initial space feature point calculated based on the feature point set and a photographing device of the plurality of image frames being less than a second preset distance threshold, and the second preset distance threshold being less than the first preset distance threshold;

disparity calculated based on the feature point set being greater than a preset disparity threshold; or an average reprojection error calculated based on the feature point set being greater than a preset error threshold.

6. The feature map generation method according to claim 5, further comprising:

performing the operation of determining a representative feature point from the feature point set based on the feature point set not satisfying the filtering condition.

7. The feature map generation method according to claim 1, wherein generating the feature map based on the space feature point comprises:

determining an average descriptor corresponding to the updated feature point set based on a feature descriptor of each image feature point in the updated feature point set;

selecting a feature descriptor of which a similarity to the average descriptor satisfies a similarity condition from the feature descriptors of the image feature points in the updated feature point set, and using the selected feature descriptor as a reference descriptor;

projecting the space feature point onto an image to which each image feature point in the updated feature point set belongs to obtain a plurality of projection feature points, and determining a feature descriptor corresponding to each projection feature point based on a position in the corresponding image at which each projection feature point is located;

determining a reprojection error corresponding to each projection feature point based on a difference between the feature descriptor corresponding to the projection feature point and the reference descriptor; and collecting a reprojection error corresponding to each projection feature point to obtain a target error, iteratively updating the space feature point based on the target error, obtaining a target space feature point corresponding to the updated feature point set based on the iteration stop condition being satisfied, and generating the feature map based on the target space feature point.

8. The feature map generation method according to claim 1, wherein the separately extracting comprises:

inputting the image into a trained feature extraction model, and outputting a first tensor corresponding to the image feature points and a second tensor corresponding to the feature descriptors by using the trained feature extraction model, the first tensor being used for describing a possibility of each feature point existing in each area of the image;

performing non-maximum suppression processing on the image based on the first tensor to determine the image feature points of the image from the image; and converting the second tensor into a third tensor consistent with a size of the image, and determining a vector in the third tensor that matches a position in the corresponding image at which each image feature point is located as a descriptor corresponding to the image feature point.

9. The feature map generation method according to claim 8, wherein the first tensor comprises a plurality of channels, and wherein performing the non-maximum suppression processing on the image comprises:

obtaining, in a direction of the plurality of channels, a maximum value at each position in the first tensor and a channel index corresponding to each maximum value to separately obtain the third tensor and a fourth tensor;

determining a target numerical value from the third tensor, and searching for a neighborhood of a position of the target numerical value in the third tensor, the neighborhood of the position the target numerical value comprising a plurality of target positions, and an image distance between a position in the image corresponding to each target position and a position in the image corresponding to the position of the target numerical value being less than a preset distance threshold; and determining a target pixel point in the image corresponding to the position of the target numerical value as each image feature point of the image based on a search result indicating that the target numerical value is greater than a numerical value corresponding to another position in the neighborhood, and the target pixel point being determined from the image based on the position of the target numerical value and a channel index value, and the channel index value being determined from the fourth tensor based on the position of the target numerical value.

10. The feature map generation method according to claim 1, wherein obtaining the plurality of image frames photographed for the target scene comprises:

obtaining a plurality of original image frames photographed for the target scene by a fisheye camera, and performing distortion correction on the plurality of original image frames to obtain the plurality of image frames photographed for the target scene.

11. The feature map generation method according to claim 1, wherein the plurality of image frames are photographed by a camera mounted on a target moving device, and the feature map generation method further comprises:

obtaining inertial measurement data and speed measurement data of the target moving device during photographing the plurality of image frames, and using the inertial measurement data and the speed measurement data to calculate an initial pose of the to-be-positioned moving device; and determining pre-integration information based on the inertial measurement data, constructing a factor graph based on the pre-integration information and the speed measurement data, and adjusting the initial pose based on the factor graph to obtain a target pose; and the generating a feature map based on the space feature point comprises:

establishing a correspondence relationship between the space feature point and the target pose, and generating the feature map based on the correspondence relationship and the space feature point.

12. The feature map generation method according to claim 1, further comprising:

obtaining inertial measurement data and speed measurement data of the to-be-positioned moving device, and a target image photographed by the moving device in the target scene, and using the inertial measurement data and the speed measurement data to determine an initial pose of the to-be-positioned moving device;

determining, from the feature map, based on the initial pose, the space feature point matching a position to obtain a target space feature point; and determining an image feature point matching the target space feature point from the target image, forming the determined image feature point and the target space feature point into a matching pair, and determining positioning information of the moving device based on the matching pair.

13. The feature map generation method according to claim 12, wherein the determining the positioning information of the moving device based on the matching pair comprises:

projecting the space feature point in the matching pair onto the target image to obtain a projection feature point;

calculating a reprojection error based on the projection feature point and the image feature point in the matching pair; and determining a pose corresponding to a minimum value of a least square function of the reprojection error as a corrected pose, and correcting the initial pose by using the corrected pose to obtain the positioning information.

14. The feature map generation method according to claim 12, wherein the to-be-positioned moving device comprises a to-be-parked vehicle or a vacuum cleaning robot.

15. A feature map generation apparatus comprising:

at least one memory configured to store program code; and at least one processor configured to read the program code and operate as instructed by the program code, the program code comprising feature extraction code configured to cause at least one processor to obtain a plurality of image frames photographed for a target scene, separately extracting image feature points from each image frame of the plurality of image frames, and determine corresponding feature descriptors based on a position in a corresponding image at which the extracted image feature points are located;

feature point set determining code configured to cause at least one of the at least one processor to form image feature points with a matching relationship in the image feature points of each image frame into a feature point set;

difference calculation code configured to cause at least one of the at least one processor to determine a representative feature point from the feature point set, and calculating a difference between a feature descriptor corresponding to a remaining image feature point in the feature point set and a feature descriptor corresponding to the representative feature point;

position update code configured to cause at least one of the processors to determine a position error of the feature point set based on the difference, iteratively updating the remaining image feature point in the feature point set based on the position error, and obtain an updated feature point set based on an iteration stop condition being satisfied; and feature map generation code configured to cause at least one of the at least one processor to determine a space feature point corresponding to the updated feature point set based on a position in the corresponding image at which each image feature point in the updated feature point set is located, and generate a feature map based on the space feature point, the feature map positioning a to-be-positioned moving device in the target scene, wherein the position update code is further configured to cause at least one of the at least one processor to:

separately using each remaining image feature point in the feature point set as a target feature point, and separately calculating matching confidence between each target feature point and the representative feature point; and calculating a position error corresponding to each target feature point based on the matching confidence and difference corresponding to each feature point.

16. The feature map generation apparatus according to claim 15, wherein the feature map generation code is further configured to cause at least one of the at least one processor to:

determine an average descriptor corresponding to the updated feature point set based on a feature descriptor of each image feature point in the updated feature point set;

select a feature descriptor of which a similarity to the average descriptor satisfies a similarity condition from the feature descriptors of the image feature points in the updated feature point set, and use the selected feature descriptor as a reference descriptor;

project the space feature point onto an image to which each image feature point in the updated feature point set belongs to obtain a plurality of projection feature points, and determine a feature descriptor corresponding to each projection feature point based on a position in the corresponding image at which each projection feature point is located;

determine a reprojection error corresponding to each projection feature point based on a difference between the feature descriptor corresponding to the projection feature point and the reference descriptor; and collect a reprojection error corresponding to each projection feature point to obtain a target error, iteratively update the space feature point based on the target error, obtain a target space feature point corresponding to the updated feature point set based on the iteration stop condition being satisfied, and generate the feature map based on the target space feature point.

17. The feature map generation apparatus according to claim 15, wherein the position update code is further configured to cause at least one of the at least one processor to:

collect the position error corresponding to each target feature point to obtain the position error of the feature point set.

18. A non-transitory computer-readable storage medium storing computer code which, when executed by at least one processor, causes the at least one processor to at least:

obtain a plurality of image frames photographed for a target scene, separately extracting image feature points from each image frame of the plurality of image frames, and determine corresponding feature descriptors based on a position in a corresponding image at which the extracted image feature points are located;

form image feature points with a matching relationship in the image feature points of the each image frame into a feature point set;

determine a representative feature point from the feature point set, and calculate a difference between a feature descriptor corresponding to a remaining image feature point in the feature point set and a feature descriptor corresponding to the representative feature point;

determine a position error of the feature point set based on the difference, iteratively updating the remaining image feature point in the feature point set based on the position error, and obtaining an updated feature point set based on an iteration stop condition being satisfied; and determine a space feature point corresponding to the updated feature point set based on a position in the corresponding image at which each image feature point in the updated feature point set is located, and generating a feature map based on the space feature point, the feature map positioning a to-be-positioned moving device in the target scene, wherein determining the position error comprises:

separately using each remaining image feature point in the feature point set as a target feature point, and separately calculating matching confidence between each target feature point and the representative feature point; and calculating a position error corresponding to each target feature point based on the matching confidence and difference corresponding to each feature point.

19. The non-transitory computer-readable storage medium according to claim 18, wherein determining the position error comprises:

collecting the position error corresponding to each target feature point to obtain the position error of the feature point set.

20. The non-transitory computer-readable storage medium according to claim 18, wherein the separately calculate the matching confidence between each target feature point and the representative feature point comprises:

separately obtaining a feature descriptor of each target feature point, and obtaining a feature descriptor of the representative feature point; and separately calculating a vector similarity between the feature descriptor of each target feature point and the feature descriptor of the representative feature point, and using each vector similarity as matching confidence between each target feature point and the representative feature point.

* * * * *